US007500773B2

(12) United States Patent
Komatsu

(10) Patent No.: US 7,500,773 B2
(45) Date of Patent: Mar. 10, 2009

(54) LAMP UNIT OF VEHICLE HEADLAMP

(75) Inventor: Motohiro Komatsu, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 227 days.

(21) Appl. No.: 11/704,002

(22) Filed: Feb. 8, 2007

(65) Prior Publication Data

US 2007/0201241 A1 Aug. 30, 2007

(30) Foreign Application Priority Data

Feb. 24, 2006 (JP) ............................ 2006-048363

(51) Int. Cl.
*B60Q 1/02* (2006.01)
*F21V 21/00* (2006.01)

(52) U.S. Cl. ....................... 362/545; 362/544; 362/539; 362/543

(58) Field of Classification Search ................. 362/545, 362/544, 538, 539, 543, 507, 487, 230, 231, 362/800, 242
See application file for complete search history.

(56) References Cited

U.S. PATENT DOCUMENTS 6,776,513 B2 * 8/2004 Albou ........................ 362/507
6,857,769 B2 * 2/2005 Brun .......................... 362/517
7,387,416 B2 * 6/2008 Tsukamoto et al. ......... 362/518
2002/0196641 A1 * 12/2002 Brun .......................... 362/545

FOREIGN PATENT DOCUMENTS

| | | |
|---|---|---|
| JP | 64-67804 | 3/1989 |
| JP | 6-28909 | 4/1994 |
| JP | 2005-166590 | 6/2005 |
| JP | 2005-317226 | 11/2005 |

OTHER PUBLICATIONS

Patent Abstracts of Japan, Publication No. 2005-166590, Publication Date: Jun. 23, 2005, 2 pages.
Patent Abstracts of Japan, Publication No. 2005-317226, Publication Date: Nov. 10, 2005, 2 pages.
Patent Abstracts of Japan, Publication No. 64-067804, Publication Date: Mar. 14, 1989, 2 pages.

* cited by examiner

*Primary Examiner*—Bao Q Truong
(74) *Attorney, Agent, or Firm*—Osha • Liang LLP

(57) ABSTRACT

A lamp unit of a vehicle headlamp characterized in a lamp unit of a vehicle headlamp includes a projecting lens arranged on an optical axis extended in a front and rear direction of a vehicle, a first light emitting element arranged on a rear side of a rear side focal point of the projecting lens, and a reflector for reflecting light from the first light emitting element to a front side to be proximate to an optical axis. A vicinity of a rear side focal face of the projecting lens is arranged with a plurality of second light emitting elements for emitting light to the projecting lens.

9 Claims, 16 Drawing Sheets

LAMP UNIT OF VEHICLE HEADLAMP

This application claims foreign priority from Japanese Patent Application No. 2006-048363, filed on Feb. 24, 2004, the entire contents of which are hereby incorporated by reference.

BACKGROUND OF THE INVENTION

1. Field of the Invention

The present invention relates to a lamp unit of a vehicle headlamp, particularly relates to a lamp unit of a projector type constituting a light source by a light emitting element of a light emitting diode or the like.

2. Related Art

In recent years, there has been adopted a lamp unit constituting a light source by a light emitting element of a light emitting diode or the like also in a vehicle headlamp.

For example, "Patent Reference 1" describes a lamp unit of a so-called projector type including a projecting lens arranged on an optical axis extended in a front and rear direction of a vehicle, a light emitting element arranged on a rear side of a rear side focal point of the projecting lens, and a reflector for reflecting light from the light emitting element to a front side to be proximate to the optical axis.

Further, "Patent Reference 2" describes a lamp unit of the projector type arranged with a plurality of sets of light emitting elements and reflectors for one projecting lens.

Further, "Patent Reference 3" and "Patent Reference 4" describe a lamp unit of a projector type in which although a light source is not constituted by a light emitting element, an auxiliary light source for irradiating light to a projecting lens is arranged at a vicinity of a front side of a rear side focal point face of the projecting lens.

[Patent Reference 1] JP-A-2005-166590

[Patent Reference 2] JP-A-2005-317226

[Patent Reference 3] JP-A-64-067804

[Patent Reference 4] JP-U-06-028909

When the projector type lamp unit described in "Patent Reference 1" or "Patent Reference 2" is adopted, in the lamp unit constituting the light source by the light emitting element, a light flux utilizing rate for light from the light emitting element can be promoted, however, according to the light emitting element of the light emitting diode or the like, a light emitting amount thereof is much smaller than that of a light source bulb of a halogen bulb, a discharge bulb, or the like.

Therefore, the vehicle headlamp as described in "Patent Reference 1" was devised to arrange a number of the lamp units or, as described in "Patent Reference 2," to arrange a plurality of sets of light emitting elements and reflectors for the single projecting lens.

However, according to the constitution described in "Patent Reference 1," there exists a problem that the vehicle headlamp is large-sized by arranging the number of lamp units.

On the other hand, according to the constitution described in "Patent Reference 2", there exists a problem that the lamp unit itself is large-sized by arranging the plurality of sets of light emitting elements and reflectors for the single projecting lens and, as a result, the vehicle headlamp is also large-sized. Further, when such a lamp constitution is adopted, the lamp constitution is rather complicated.

SUMMARY OF THE INVENTION

One or more embodiments of the invention provide a lamp unit of a vehicle headlamp capable of downsizing and simplifying a lamp when a lamp unit of a projector type is adopted as a lamp unit of a vehicle headlamp constituting a light source by a light emitting element.

One or more embodiments of the invention involve arranging a plurality of second light emitting elements for emitting light to a projecting lens at a vicinity of a rear side focal face of the projecting lens other than a first light emitting element as a light source of a lamp unit of a projector type.

That is, a lamp unit of a vehicle headlamp according to one or more embodiments of the invention is characterized in a lamp unit of a vehicle headlamp comprising a projecting lens arranged on an optical axis extended in a front and rear direction of a vehicle, a first light emitting element arranged on a rear side of a rear side focal point of the projecting lens, and a reflector for reflecting light from the first light emitting element to a front side to be proximate to an optical axis; wherein a vicinity of a rear side focal face of the projecting lens is arranged with a plurality of second light emitting elements for emitting light to the projecting lens.

"Light emitting element" in "first light emitting element" and "second light emitting element" mentioned above signifies a light source in an element shape including a light emitting chip for emitting light in face emittance substantially in a point-like shape, a kind thereof is not particularly limited but, for example, a light emitting diode, a laser diode or the like can be adopted.

The "first light emitting element" may be arranged on the optical axis or may be arranged at a position deviated from the optical axis so far as the "first light emitting element" is arranged on the rear side of the rear side focal point of the projecting lens.

A number of pieces or a specific arrangement of the "plurality of second light emitting elements" are not particularly limited so far as the "plurality of second light emitting elements" are arranged at the vicinity of the rear side focal face of the projecting lens. Further, the "plurality of second light emitting elements" may not necessarily be directed in a direction of a front face of the lamp unit so far as the "plurality of second light emitting elements" are arranged to emit light to the projecting lens.

The "vicinity of the rear side focal face of the projecting lens" signifies a region within 10 mm in the front and rear direction relative to the rear side focal face of the projecting lens.

As shown by the above-described constitution, the lamp unit of the vehicle headlamp according to the invention is constituted as the projector type lamp unit constituting the light source by the first light emitting element, the vicinity of the rear side focal face of the projecting lens is arranged with the plurality of second light emitting elements for irradiating light to the projecting lens, and therefore, a predetermined basic light distribution pattern can be formed by switching ON the first light emitting element, by additionally switching ON a portion or a total of the plurality of second light emitting elements, an additional light distribution pattern can additionally be formed to the basic light distribution pattern, thereby, a light distribution pattern formed by light irradiated from the lamp unit can be made to be sufficiently bright.

All of the plurality of second light emitting elements are arranged at the vicinity of the rear side focal face of the projecting lens, and therefore, although light emitted from the respective second light emitting elements are incident on the projecting lens as directly emitted light, an inverted projected image of the light emitting chip can be made to be sufficiently bright, thereby, the additional light distribution pattern can be made to be sufficiently bright.

In this way, according to the invention, when a projector type lamp unit is adopted as the lamp unit of the vehicle headlamp constituting the light source by the light emitting element, the lamp can be downsized and simplified.

In the above-described constitution, when the plurality of second light emitting elements are arranged at positions remote from the rear side focal face of the projecting lens in the front and rear direction, the following operation and effect can be achieved.

That is, when the plurality of second light emitting elements are arranged on the rear side focal face of the projecting lens, the inverted projected images of light emitting chips of the respective second light emitting elements are formed dispersed remotely from each other as clear images remaining in outer shapes thereof, and therefore, by additionally forming an additional light distribution pattern as an assembly thereof, a nonuniformity in a light distribution is brought about in a light distribution pattern formed by light irradiated from the lamp unit.

In contrast thereto, when the plurality of second light emitting elements are arranged at positions remote from the rear side focal face of the projecting lens in the front and rear direction, in comparison with a case of arranging the plurality of second light emitting elements on the rear side focal face, the inverted projected images of the light emitting chips of the respective second light emitting elements become images having large outer shapes and low clarity, and therefore, the nonuniformity in the light distribution by additionally forming the additional light distribution pattern can be prevented. At the same time, although an amount of displacing the respective second light emitting elements in the front and rear direction relative to the rear side focal face of the projecting lens is not particularly limited so far as the amounts are within a range disposed at a vicinity of the rear side focal face of the projecting lens, for example, the amount can be set to a value of about 1 through 6 times as much as a size of the light emitting chips of the respective second light emitting elements.

In the above-described constitution, when the plurality of second light emitting elements are arranged to be contiguous to each other in a horizontal direction, the inverted projected images of the light emitting chips of the respective light emitting elements can be formed to be contiguous to each other in the horizontal direction, thereby, the additional light distribution pattern can be formed as a transversely-prolonged light distribution pattern suitable for illuminating a vehicle front side road face. The plurality of second light emitting elements may be arranged without gaps therebetween, or may be arranged with more or less gaps therebetween.

In the above-described constitution, when a shade for shielding a portion of light reflected from the reflector is arranged between the projecting lens and the reflector such that an upper end edge of the shade passes the rear side focal point of the projecting lens, a light distribution pattern for low beam having a cutoff line at an upper end portion thereof can be formed by light irradiated from the lamp unit.

At the same time, when the shade is constituted as a mirror member including an upward directed mirror face extended from the upper end edge of the shade in a rear direction, also light to be shielded by the shade can be made to be incident on the projecting lens by reflecting the light in an upper direction, and the light can effectively be utilized as front irradiating light.

In a case of arranging the shade, when the plurality of second light emitting elements are arranged on an upper side of the optical axis, the vehicle front side road face can be illuminated by the emitted light, at the same time, when the plurality of second light emitting elements are arranged on a front side of the rear side focal face of the projecting lens, the emitted light can further be made to be incident on the projecting lens.

In a case of constituting the shade as the mirror member, when the mirror member is constituted to include a downward directed inclined face extended from a front end edge of the upward directed mirror face of the mirror member in the rear direction to a skewed lower side, thereafter, the plurality of second light emitting elements are arranged on a rear side of the rear side focal face of the projecting lens and at a lower vicinity of the downward directed inclined face, by the emitted light, the additional light distribution pattern can be formed continuously to the light distribution pattern for low beam on an upper side of the cutoff line of the light distribution pattern for low beam. Therefore, by additionally switching ON the plurality of second light emitting elements, a light distribution pattern for high beam can be formed.

In this case, when the downward directed inclined face of the mirror member is constituted as a mirror face, light reflected by the downward directed inclined face can be made to be incident on the projecting lens and the light can effectively be utilized as front irradiating light. By constituting in this way, the additional light distribution pattern can be made to be a light distribution pattern a lower end edge vicinity portion of which is relatively bright and therefore, a continuity between the additional light distribution pattern and the light distribution pattern for low beam can be promoted.

In the above-described constitution, when there is constructed a constitution in which the plurality of second light emitting elements are supported by a common metal made member, the constitution of the lamp unit can further be simplified and accuracies of positioning the respective second light emitting elements can be promoted. By constituting in this way, heat generated by switching ON the respective second light emitting elements can be radiated by swiftly conducting the heat to the metal made member having a large heat capacity.

Other aspects and advantages of the invention will be apparent from the following description and the appended claims.

DETAILED DESCRIPTION OF THE EXEMPLARY EMBODIMENTS

An explanation will be given of an embodiment of the invention in reference to the drawings as follows.

Figure 1:
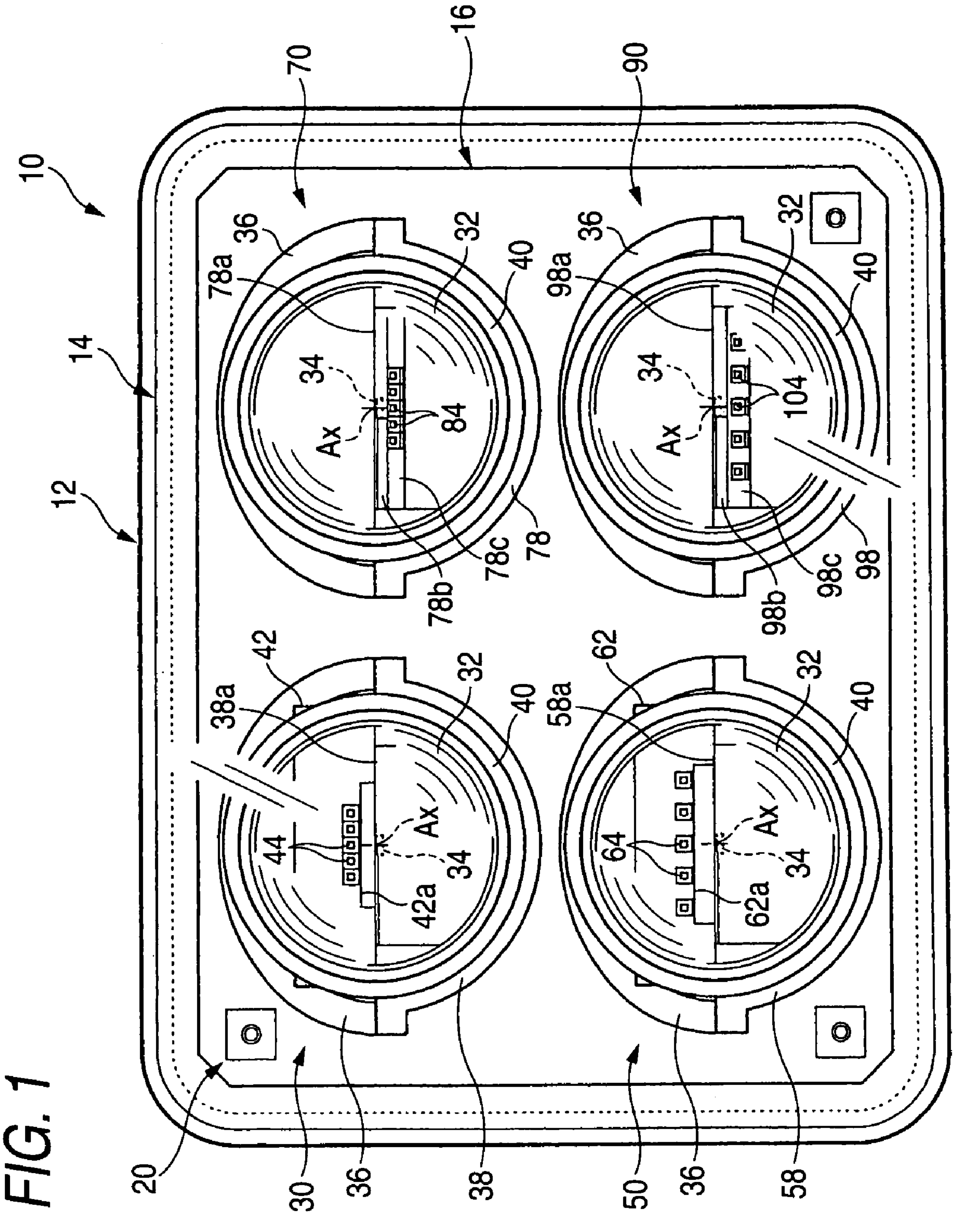
FIG. 1 is a front view showing a vehicle headlamp according to an embodiment of the invention.

FIG. 1 is a front view showing a vehicle head lamp 10 according to an embodiment of the invention.

The vehicle headlamp 10 according to the embodiment shown is constructed by a constitution of containing four of lamp units 30, 50, 70, 90 at inside of a lamp chamber including a lamp body 12 and a transparent cover 14 in a light transmitting state attached to an opening portion of a front end of the lamp body 12.

All of the four lamp units 30, 50, 70, 90 are lamp units of a projector type and are fixedly supported by a common metal made bracket 16 in two upper and lower stages arrangement.

The metal made bracket 16 is formed in a shape of a vertical panel, and formed with shelf-like projected portions (not illustrated) for fixedly supporting the four lamp units 30, 50, 70, 90 at four portions of a front face thereof. The metal made bracket 16 is supported by the lamp body 12 by way of an aiming mechanism 20 inclinably in an up and down direction and a left and right direction.

The four lamp units 30, 50, 70, 90 are provided with optical axes Ax extended in parallel with each other, and at a stage of finishing to adjust the optical axes by the aiming mechanism 20, by inclining the metal made bracket 16, the optical axes Ax are arranged in a state of being extended in a direction of a lower direction by about 0.5 through 0.6° relative to a front and rear direction of a vehicle.

In the four lamp units 30, 50, 70, 90, two of the lamp units 30, 50 are lamp units exclusively for low beam, and remaining two of the lamp units 70, 90 are lamp units for both of low beam and high beam.

Next, an explanation will be given of respective constitutions of the four lamp units 30, 50, 70, 90.

First, the constitution of the lamp unit 30 exclusively for low beam will be explained.

Figure 2:
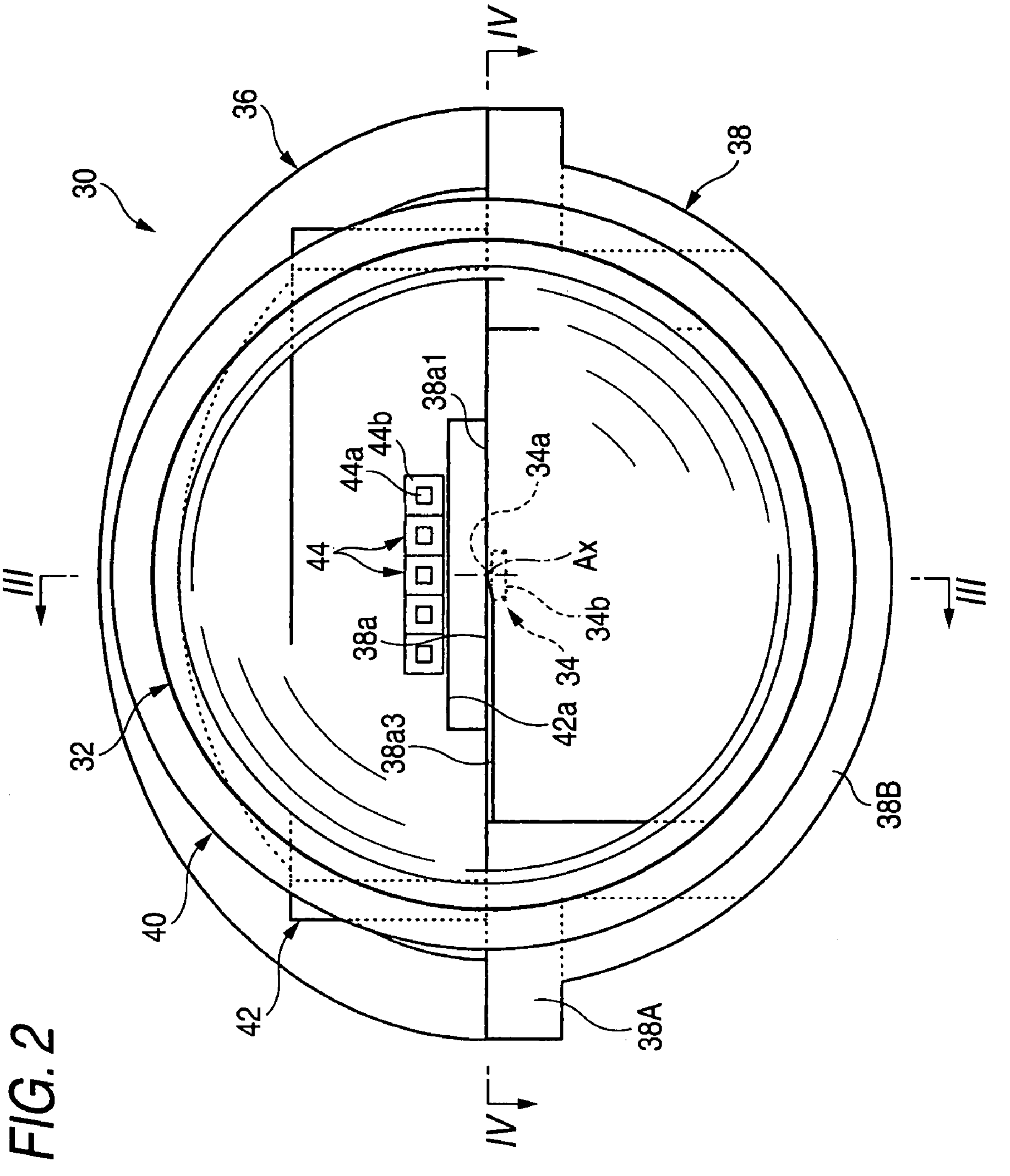
FIG. 2 is a front view showing a first one of a lamp unit of the vehicle headlamp.
Figure 3:
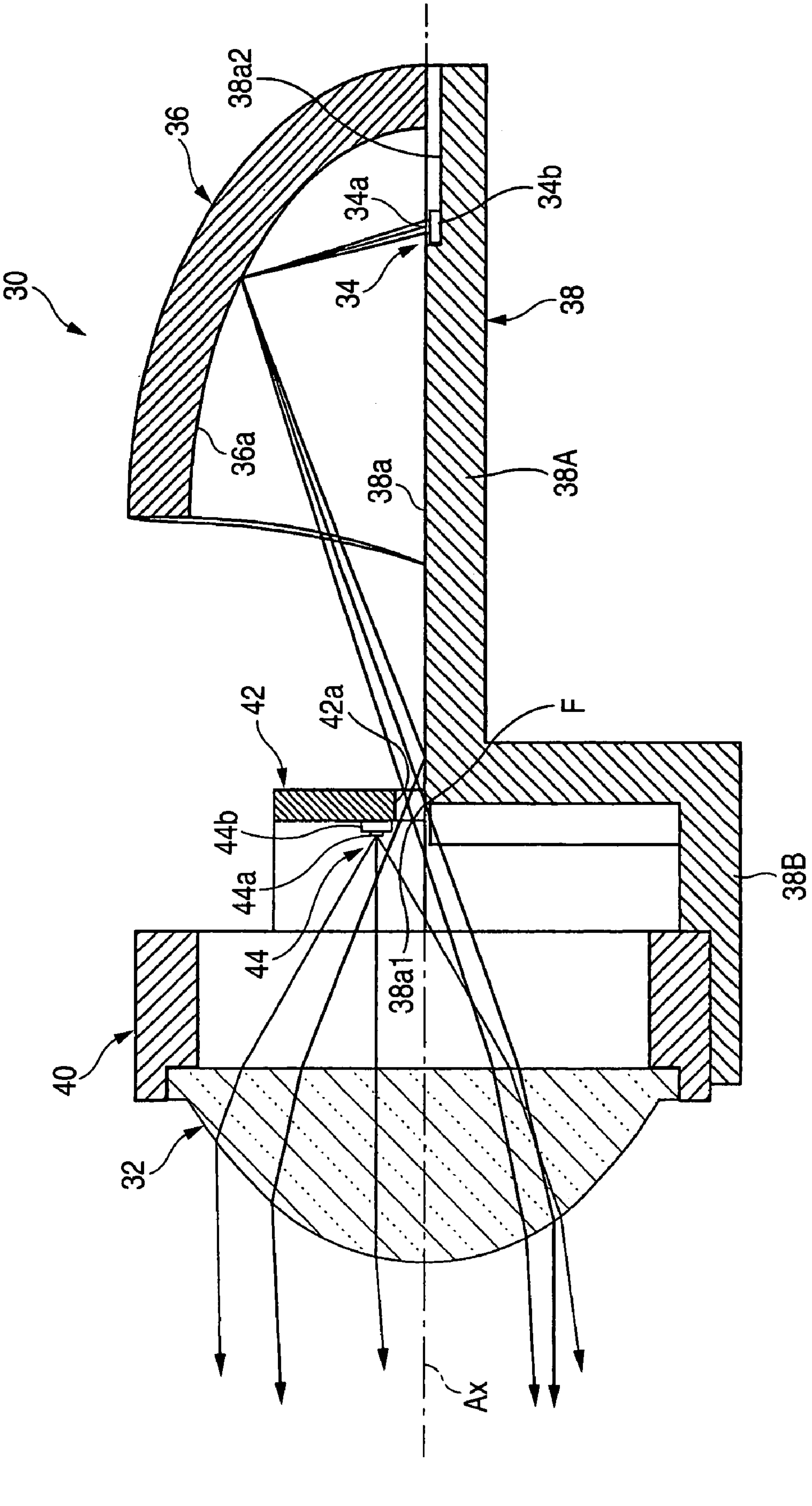
FIG. 3 is a sectional view taken along a line III-III of FIG. 2.
Figure 4:
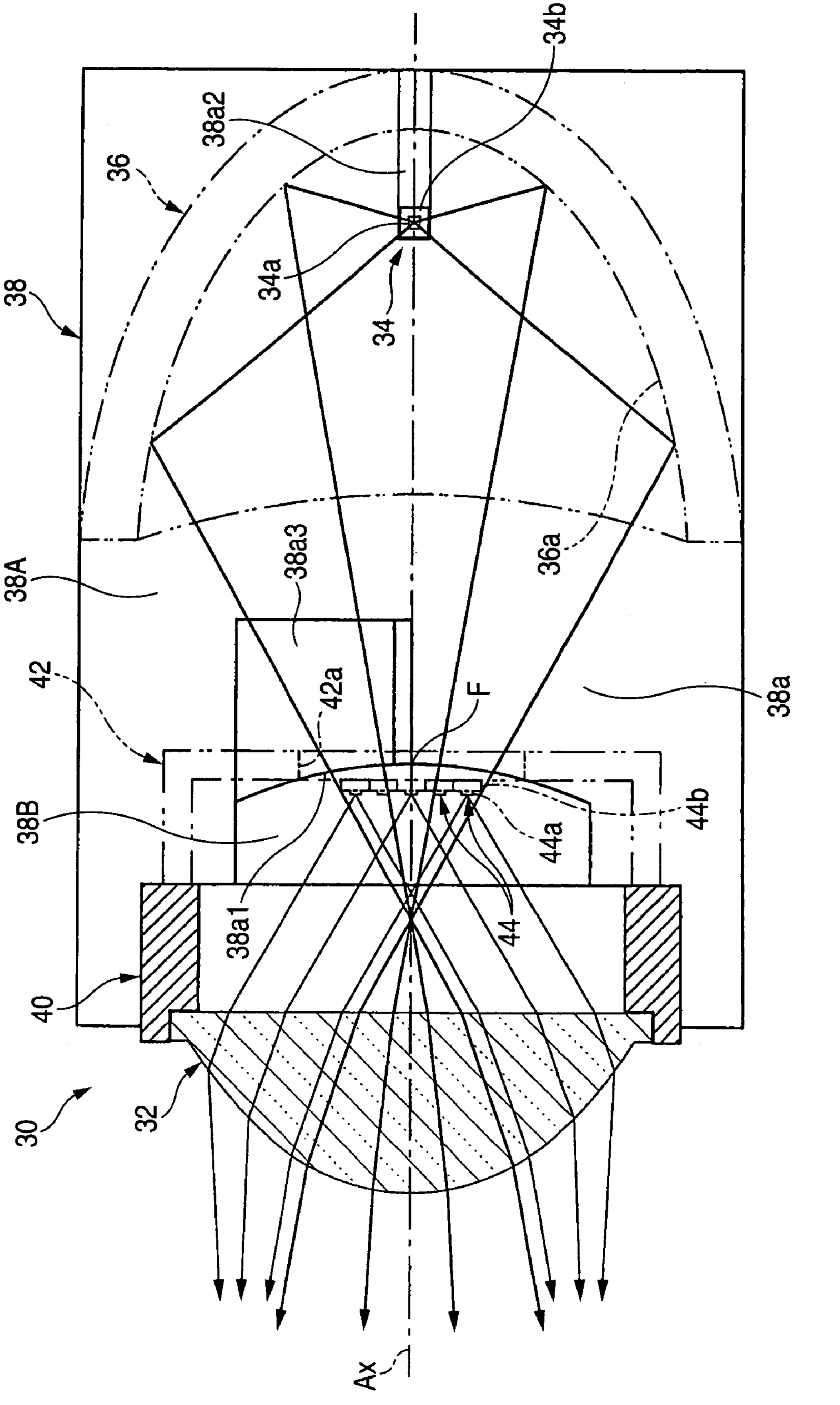
FIG. 4 is a sectional view taken along a line IV-IV of FIG. 2.

FIG. 2 is a front view showing the lamp unit 30, FIG. 3 is a sectional view taken along a line III-III of FIG. 2, FIG. 4 is a sectional view taken along a line IV-IV of FIG. 2.

As shown by the drawings, the lamp unit 30 comprises a projecting lens 32, a first light emitting element 34, a reflector 36, a base member 38, a lens holder 40, a metal made member 42, and five second light emitting elements 44. The lamp unit 30 is fixedly supported by a shelf-like projected portion of the metal made bracket 16 at the base member 38.

The base member 38 is a metal made member and comprises a flat plate portion 38A including an upper face 38*a* extended along a horizontal face including the optical axis Ax of the lamp unit 30, and a semicylindrical portion 38B formed to bulge by substantially a semicylindrical shape to a lower side at a front end portion of the flat plate portion 38A.

The projecting lens 32 is a flat convex aspherical lens having a front side surface in a concave face and a rear side surface in a flat face and is arranged on the optical axis Ax and a back focal length thereof is set to a value of about 22 mm. Further, the projecting lens 32 is constituted to project an image on a rear side focal face including the rear side focal point F onto a vertically imaginary screen arranged on a front side of the lamp as the inverted image. The projecting lens 32 is fixedly supported by a front end ring-like groove portion of the lens holder 40 in a cylindrical shape at a peripheral edge portion thereof. Further, the lens holder 40 is fixedly supported by the semicylindrical portion 38B of the base member 38 at a lower half portion thereof.

The first light emitting element 34 is a white light emitting diode and comprises a light emitting chip 34*a* including a light emitting face in a square shape of about 1 mm square, and a board 34*b* supporting the light emitting chip 34*a*. The light emitting chip 34*a* is sealed by a thin film formed to cover the light emitting face.

The first light emitting element 34 is fixedly supported by the flat plate portion 38A of the base member 38 on a rear side of the rear side focal point F of the projecting lens 32. The first light emitting element 34 is positioned at inside of a recess groove portion 38*a*2 formed at a rear portion of the upper face 38*a* of the flat plate portion 38A at the board 34*b* in a state of arranging the light emitting chip 34*a* in a vertical upper direction on the optical axis Ax.

The reflector 36 is formed in a shape of a half dome to cover the first light emitting element 34 from an upper side and is mounted to be fixed to the upper face 38*a* of the flat plate portion 38A of the base member 38 at a lower end face of a peripheral edge thereof. The reflector 36 reflects light emitted from the light emitting chip 34*a* of the first light emitting element 34 by being directed to the projecting lens 32 to be proximate to the optical axis Ax.

Specifically, a reflecting face 36*a* of the reflector 36 is set to an elliptical shape in a sectional shape thereof along a flat face including the optical axis Ax. According to the reflecting face 36*a*, a sectional shape thereof along a vertical face including the optical axis Ax is set to an elliptical shape constituting a first focal point by a light emitting center of the light emitting chip 34*a* and constituting a second focal point by the rear side focal point F of the projecting lens 32, and an eccentricity thereof is gradually increased while making the first focal point stay constant from the vertical face including the optical axis Ax over to a horizontal face including the optical axis Ax. Thereby, the reflecting face 36*a* converges light emitted from the light emitting chip 34*a* to the rear side focal point F of the projecting lens 32 in the vertical face and converges the light onto the optical axis Ax on a front side of the rear side focal point F to some degree in the horizontal section.

The flat plate portion 38A of the base member 38 is formed such that a front end edge 38*a*1 of the upper face 38*a* is extended substantially in a circular arc shape in a horizontal direction along a rear side focal face (that is, a curved face substantially in a spherical shape formed by the rear side focal point F and a rear side focal point outside of the axis) of the projecting lens 32. A portion on a left side (right side in plane view of a lamp) of the optical axis Ax at the front end edge 38*a*1 is formed to extend horizontally in a left direction from the optical axis Ax, on the other hand, a portion thereof on a right side of the optical axis Ax is formed to extend from the optical axis Ax in a right direction in a skewed lower direction (for example, lower direction by 15°) thereafter extended horizontally in the right direction. The portion on a right side of the optical axis Ax at the upper face 38*a* of the flat portion 38A is constituted as a stepped down flat face portion 38*a*3 extended horizontally in a rear direction over a predetermined length while staying to be in the shape of the front end edge 38*a*1.

The flat plate portion 38A of the base member 38 functions as a shade for hampering emittance of light directed in an upper direction from the projecting lens 32 by hampering a portion of light reflected from the reflector 36 from being advanced straight since the upper face 38*a* is provided with such a shape.

According to the flat plate portion 38A, the upper face 38*a* functions as a mirror member constituted as a mirror face directed in an upper direction for regularly reflecting light reflected from the reflector 36 in an upper direction. In order to realize the function, the upper face 38*a* of the flat plate portion 38A is subjected to a mirror face treatment of depositing aluminum or the like. It is necessarily needed to apply the mirror face treatment over an entire region of the upper face 38*a* of the flat plate portion 38A, but it is sufficient when the mirror face treatment is applied over to a range on a rear side of the front end edge 38*a*1 to some degree.

The metal made member 42 is constituted as a vertical panel extended along a rear side focal plane of the projecting lens 32 (that is, a plane orthogonal to the optical axis Ax at the rear side focal point F) and is extended to be formed to fold to bend at left and right end portions thereof orthogonally to the front side. The metal made member 42 is fixedly mounted to the upper face 38*a* of the flat plate portion 38A of the base member 38 at a lower end face thereof such that front end faces of the two left and right end portions are brought into contact with a rear end face of the lens holder 40. A notched portion 42*a* having a transversely-prolonged rectangular shape is formed at a center portion in a left and right direction of a lower end face of the metal made member 42. Thereby, when the metal made member 42 is fixedly mounted to the base member 38, an opening portion in a transversely-prolonged rectangular shape is formed on an upper side of the rear side focal point F of the projecting lens 32. At the same time, a width in an up and down direction and a width in a left and right direction of the notched portion 42*a* are set to values as small as possible with a range hardly shielding light reflected from the reflector 36 and light of the reflected light reflected by the upper face 38*a* of the flat plate portion 38A.

There are five second light emitting elements 44, wherein each is a white light emitting diode and comprises a light emitting chip 44*a* having a light emitting face in a square shape of about 1 mm square, and a board 44*b* supporting the light emitting chip 44*a*. The light emitting chip 44*a* is sealed by a thin film formed to cover the light emitting face. Further, the board 44*b* is provided with an outer shape in a square shape of about 2.5 mm square in a front view thereof.

The five second light emitting elements 44 are fixedly supported by a front face of the metal made member 42 in a state of arranging the light emitting chips 44*a* to direct to a front side in the optical axis Ax direction for irradiating light to the projecting lens 32.

The five second light emitting elements 44 are arranged in a horizontal direction to be contiguous to each other without gaps therebetween at an upper vicinity of the notched portion 42*a*. Thereby, the respective second light emitting elements 44 are arranged at positions at which the light emitting chips 44*a* are comparatively proximate to the optical axis Ax on an upper side of the optical axis Ax and at positions more or less frontward from the rear side focal face of the projecting lens 32. Specifically, the respective second light emitting elements 44 are arranged at positions frontward from the rear side focal point F of the projecting lens 32 by about 2.5 mm at positions upward from the optical axis Ax by about 4 mm.

Figure 6:
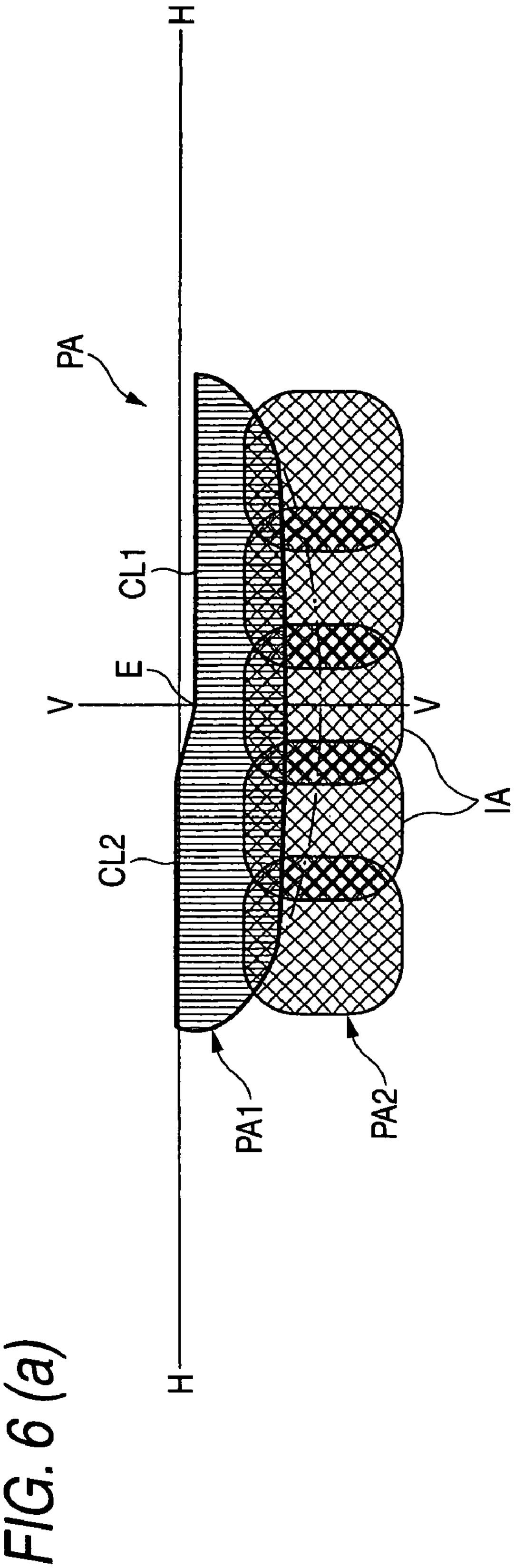
FIG. 6(*a*) is a diagram showing a light distribution pattern formed on an imaginary vertical screen disposed at a position of 25 m frontward from the lamp unit by light emitted from the first one of the lamp unit to a front side, FIG. 6(*b*) is a diagram showing a light distribution pattern formed on the imaginary vertical screen by light emitted from the second one of the lamp unit to the front side.
Figure 6:
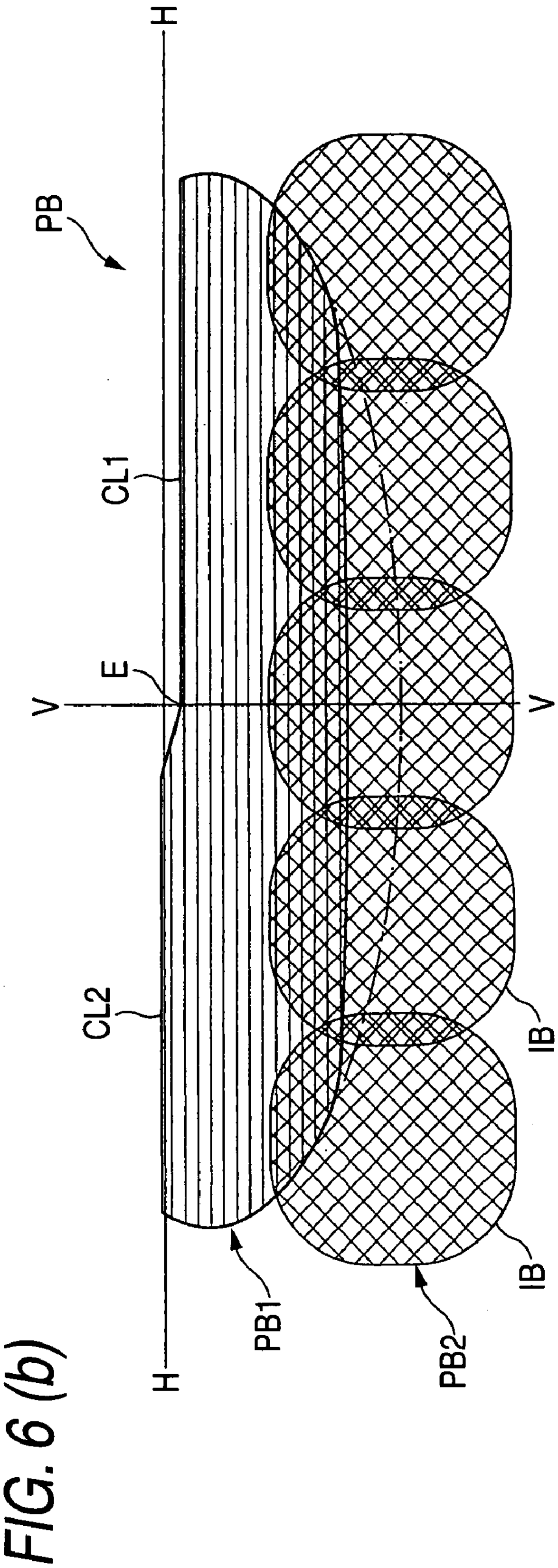

FIG. 6(*a*) is a diagram showing a light distribution pattern PA formed on an imaginary vertical screen arranged at a position 25 m frontward from the lamp by light irradiated from the lamp unit 30 to the front side.

As shown by the drawing, the light distribution pattern PA is formed as a light distribution pattern synthesized with a basic light distribution pattern PA1 and an additional light distribution pattern PA2.

The basic light distribution pattern PA1 is a light distribution pattern formed by light from the light emitting chip 34*a* reflected by the reflecting face 36*a* of the reflector 36 and incident on the projecting lens 32 and is formed as a transversely-prolonged comparatively small light distribution pattern having substantially a bow-like shape.

The basic light distribution pattern PA1 includes cutoff lines CL1, CL2 at an upper end portion thereof. The cutoff lines CL1, CL2 are formed as an inverted projected image of the front end edge 38*a*1 of the upper face 38*a* in the flat plate portion 38A of the base member 38. According to the cutoff lines CL1, CL2, the opposed vehicle lane side cutoff line CL1 on a right side of V-V line constituting a vertical line passing H-V constituting a vanishing point in a direction of the front face of the lamp is formed to extend horizontally, the driving vehicle side cutoff line CL2 on a left side of V-V line is formed to extend horizontally after skewedly rising to a slightly upper side of H-H line constituting a horizontal line passing H-V from the opposed vehicle lane side cutoff line CL1 by a predetermined angle (for example, 15°).

In the basic light distribution pattern PA1, a position of an elbow point E constituting an intersection of the opposed vehicle lane side cutoff line CL1 and V-V line is set to a position downward from H-V by about 0.5 through 0.6°. This is because the optical axis Ax of the lamp unit 30 is extended in a direction downward from an axis line extended in a front and rear direction of the vehicle by about 0.5 through 0.6°.

Not only light directly incident on the projecting lens after having been reflected by the reflecting face 36*a* of the reflector 36, but also, light incident on the projecting lens 32 by being regularly reflected in an upper direction by the upper face 38*a* of the flat plate portion 38A of the base member 38 after having been reflected by the reflecting face 36*a* of the reflector 36 are used to form the basic light distribution pattern PA1, and therefore, a light distribution pattern intensified with a brightness by that amount is constituted.

Although a lower end portion of the basic light distribution pattern PA1 is displaced slightly upward from a curved line indicated by a two-dotted chain line in the drawing, this is because a portion of light reflected from the reflector 36 is shielded by the metal made member 42 without passing the notched portion 42*a* of the metal made member 42.

On the other hand, the additional light distribution pattern PA2 is a light distribution pattern formed by light incident on the projecting lens 32 as directly emitted light from the light emitting chips 44*a* of the five second light emitting elements 44 and is formed as an assembly of an inverted projected images IA of the light emitting chips 44*a* of the five second light emitting elements 44 invertedly projected by the projecting lens 32.

The light emitting chip 44*a* of each of the second light emitting elements 44 is disposed at a position remote from the rear side focal point of the projecting lens 32 to the front side, and therefore, there is formed an image having a large outer shape and low clearness in comparison with a case in which the light emitting chip 44 is disposed on the rear side focal face.

Further, the five second light emitting elements 44 are arranged to be contiguous to each other in the horizontal direction on the upper side of the optical axis Ax, and therefore, the inverted projected images IA of the light emitting chips 44*a* of the respective light emitting elements 44 are formed to be contiguous to each other in the horizontal direction on the lower side of H-H line. Further, the five second light emitting elements 44 are arranged without gaps therebetween and therefore, the five inverted projected images IA are formed to partially overlap each other. Further, the respective inverted projected images IA are formed to overlap the lower end portion of the basic light distribution pattern PA1 since the respective second light emitting elements 44 are arranged at an upper vicinity of the notched portion 42*a* of the metal made member 42.

Thereby, the additional light distribution pattern PA2 is formed as a single transversely-prolonged light distribution pattern at a lower vicinity of the opposed vehicle lane side cutoff line CL1 of the basic light distribution pattern PA1.

When the respective second light emitting elements 44 are displaced from positions shown in FIGS. 2 through 4 to the lower side, the additional light distribution pattern PA2 is displaced to the upper side in accordance therewith to be proximate to the opposed vehicle lane side cutoff line CL1. On the other hand, when the respective second light emitting elements 44 are displaced to the lower side in this way, a width in an up and down direction of the notched portion 42*a* of the metal made member 42 is narrowed, an amount of shielding light reflected from the reflector 36 by the metal made member 42 is increased, as a result, the lower end portion of the basic light distribution pattern PA1 is further chipped off.

Hence, according to the lamp unit 30, by arranging the five second light emitting elements 44 at the positions shown in FIGS. 2 through 4, the basic light distribution pattern PA1 and the additional light distribution pattern PA2 are formed by a positional relationship shown in FIG. 6(*a*).

Next, an explanation will be given of a constitution of another one of a lamp unit 50 exclusive for low beam.

Figure 5:
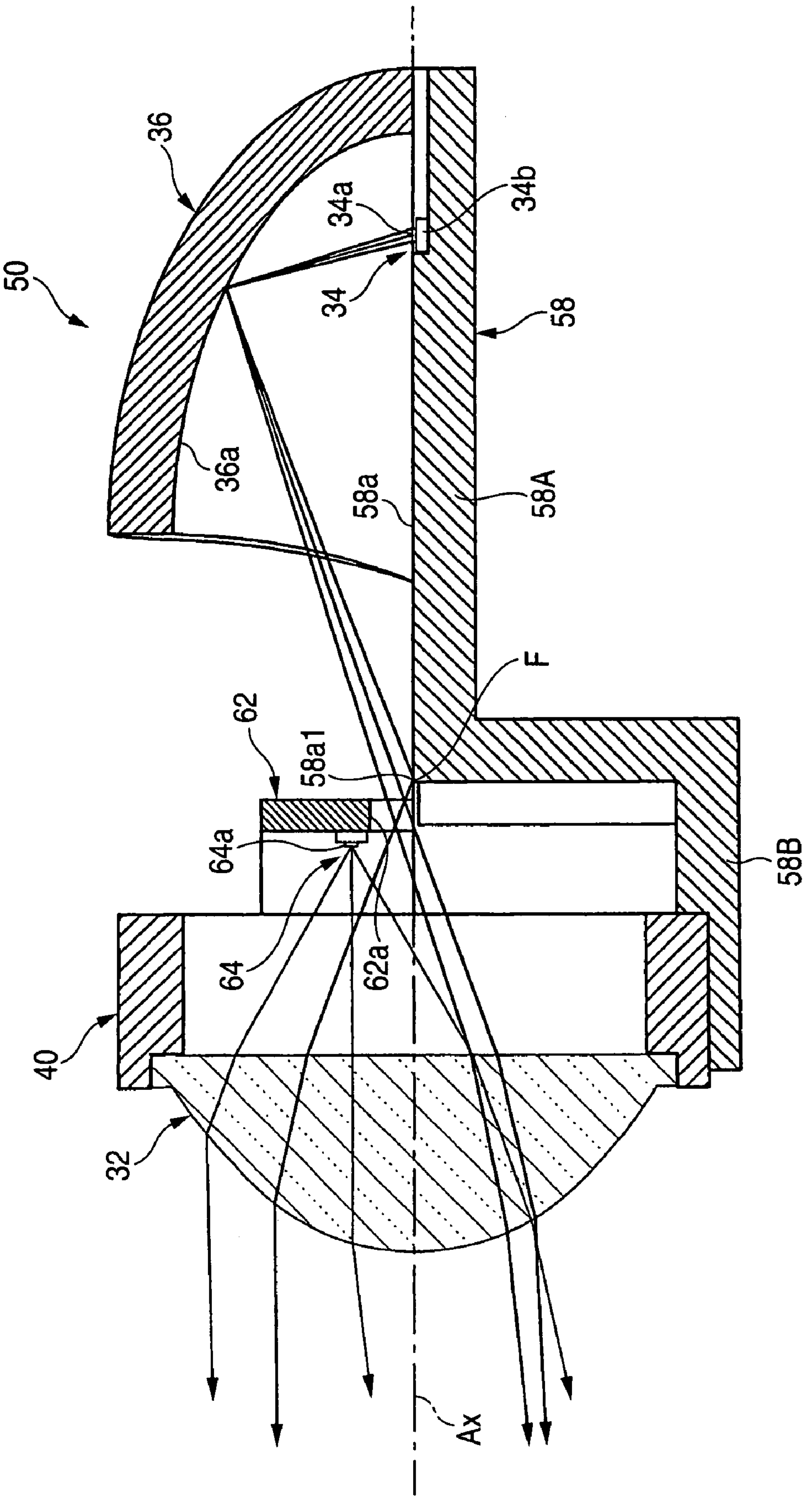
FIG. 5 is a view similar to FIG. 3 showing a second one of the lamp unit of the vehicle headlamp.

FIG. 5 is a view similar to FIG. 3 showing the lamp unit 50.

As shown by the drawing, although a basic constitution of the lamp unit 50 is similar to that of the lamp unit 30, constitutions of a base member 58 and a metal made member 62 thereof as well as arrangement of five second light emitting elements 64 differ from those of the case of the lamp unit 30.

That is, according to the base member 58 of the lamp unit 50, a front and rear length of a flat plate portion 58A thereof is set to a value slightly shorter than that of the flat plate portion 38A of the base member 38 of the lamp unit 30 (specifically, a value shorter by about 3.5 mm). However, a semicylindrical portion 58B of the base member 58 is constituted by a shape the same as that of the semicylindrical portion 38B of the base member 38, and therefore, also a positional relationship between a front end edge 58*a*1 of an upper face 58*a* of the flat plate portion 58A and the rear side focal point F of the projecting lens 32 is similar to that in the case of the base member 38. Further, also a constitution of other portion of the base member 58 is similar to that in the case of the base member 38.

Thereby, according to the lamp unit 50, a position of converging light reflected from the reflector 36 is displaced slightly frontward from the rear side focal point F of the projecting lens 32, and the image of the light emitting chip 34*a* of the first light emitting element 34 formed at the rear side focal face is made to be larger than that in the case of the lamp unit 30.

A metal made member 62 of the lamp unit 50 is arranged slightly on the front side of the rear side focal point F of the projecting lens 32 more than the metal made member 42 of the lamp unit 30. According to a notched portion 62*a* of the metal made member 62, as shown by FIG. 1, a width in an up and down direction and a width in a left and right direction thereof are set to values larger than those in the case of the notched portion 42*a*. Thereby, light reflected from the reflector 36 and light of the reflected light reflected by the upper face 58*a* of the flat plate portion 58*a* of the base member 58 is hardly shielded.

Although the five second light emitting element 64 of the lamp unit 50 are arranged to be contiguous to each other in a horizontal direction at an upper vicinity portion of the notched portion 62*a* at a front face of the metal made member 62 similar to the case of the lamp unit 30, at the same time, as shown by FIG. 1, the five second light emitting elements 64 are arranged with more or less gaps therebetween. Specifically, the respective second light emitting elements 64 are arranged at positions frontward from the rear side focal point F by about 5 mm at positions upward from the optical axis Ax by about 5 mm, gaps between the respective second light emitting elements 64 are set to a value of about 1.5 mm. A constitution per se of the respective second light emitting elements 64 is similar to that of the respective second light emitting elements 44 of the lamp unit 30.

FIG. 6(*b*) is a diagram showing a light distribution pattern PB formed on the imaginary vertical screen by light irradiated from the lamp unit 50 to the front side.

As shown by the drawing, the light distribution pattern PB is formed as a light distribution pattern synthesized with a basic light distribution pattern PB1 and an additional light distribution pattern PB2.

The basic light distribution pattern PB1 is formed as a light distribution pattern formed by light from the light emitting chip 34*a* incident on the projecting lens 32 by being reflected by the reflecting face 36*a* of the reflector 36 and as a transversely-prolonged comparatively large light distribution pattern substantially in a bow-like shape.

The basic light distribution pattern PB1 includes cutoff lines CL1, CL2 at positions the same as that of the basic light distribution pattern PA1 by shapes the same as those of the basic light distribution pattern PA1 at an upper end portion thereof.

Although the basic light distribution pattern PB1 is formed as a light distribution pattern considerably larger than the basic light distribution pattern PA1, this is because in the lamp unit 50, the image of the light emitting chip 34*a* formed at the rear side focal face of the projecting lens 32 becomes considerably larger than that of the case of the lamp unit 30.

Not only light directly incident on the projecting lens 32 after having been reflected by the reflecting face 36*a* of the reflector 36, but also, light incident on the projecting lens 32 by being regularly reflected in an upper direction by the upper face 58*a* of the flat plate portion 58A of the base member 58 after having been reflected by the reflecting face 36*a* of the reflector 36 are used for the basic light distribution pattern PB1, and therefore, there is constituted a light distribution pattern intensified with a brightness by that amount.

Although a lower end portion of the basic light distribution pattern PB1 is displaced slightly upward from a curved line indicated by a two-dotted chain line in the drawing, this is because a portion of light reflected by the reflector 36 is shielded by the metal made member 62 without passing the notched portion 62*a* of the metal made member 62.

On the other hand, the additional light distribution pattern PB2 is a light distribution pattern formed by light incident on the projecting lens 32 as directly emitted light from the light emitting chips 64*a* of the five second light emitting elements 64 and is formed as an assembly of inverted projected images IB of the light emitting chips 64*a* of the five second light emitting elements 64 invertedly projected by the projecting lens 32.

The five second light emitting elements 64 are arranged to be contiguous to each other in a horizontal direction on an upper side of the optical axis Ax, and therefore, the inverted projected images IB of the light emitting chips 64*a* of the respective second light emitting elements 64 are formed to be contiguous to each other in a horizontal direction downward from H-H line. The respective inverted projected images IB are formed to overlap a lower end portion of the basic light distribution pattern PB1 since the respective second light emitting elements 64 are arranged at an upper vicinity of the notched portion 62*a* of the metal made member 62.

The light emitting chips 64*a* of the respective light emitting elements 64 are disposed at positions remote from the rear side focal face of the projecting lens 32 further frontward from those in the case of the lamp unit 30, and therefore, the inverted projected image IB becomes an image having an outer shape larger than that of the inverted projected image IA and a clearness and a luminous intensity lower than those of the inverted projected image IA. Therefore, although the five second light emitting elements 64 are arranged with more or less gaps therebetween, the five inverted projected images IB are formed to overlap each other.

Thereby, the additional light distribution pattern PB2 is formed as a single transversely-prolonged light distribution pattern at a lower vicinity of the opposed vehicle lane side cutoff line CL1 of the basic light distribution pattern PB1.

When the respective second light emitting elements 64 are displaced from positions shown in FIG. 5 to a lower side, the additional light distribution pattern PB2 is displaced to an upper side in accordance therewith and is proximate to the opposed vehicle lane side cutoff line CL1. On the other hand, when the respective second light emitting elements 64 are displaced to the lower side in this way, a width in an up and down direction of the notched portion 62*a* of the metal made member 62 is narrowed, and therefore, an amount of shielding light reflected from the reflector 36 by the metal made member 62 is increased, as a result, a lower end portion of the basic light distribution pattern PB1 is further chipped off.

Hence, according to the lamp unit 50, by arranging the five second light emitting elements 54 to positions shown in FIG. 1 and FIG. 5, the basic light distribution pattern PB1 and the additional light distribution pattern PB2 are formed by a positional relationship as shown by FIG. 6(*b*).

Next, a constitution of a lamp unit 70 for both of low beam and high beam will be explained.

Figure 7:
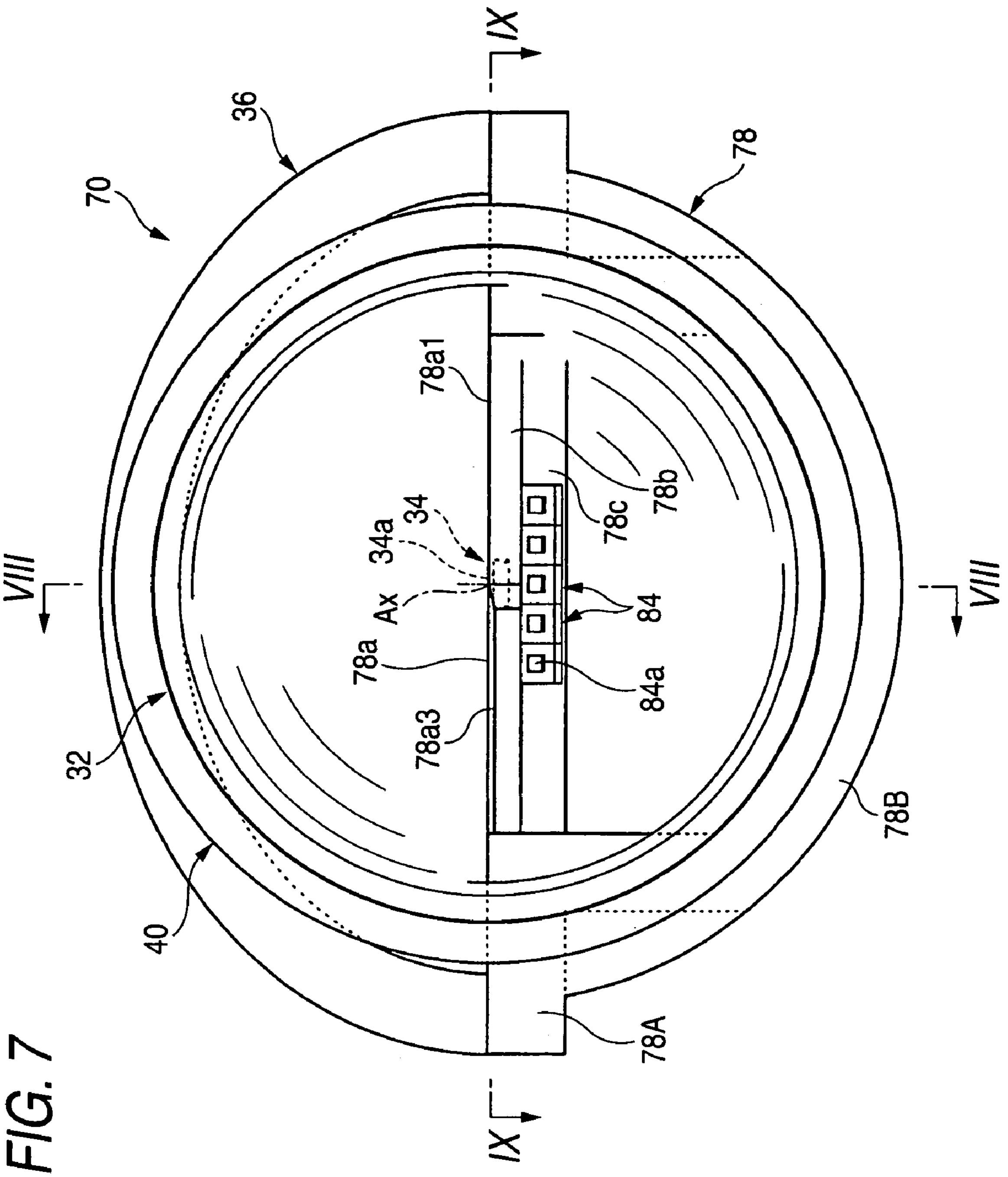
FIG. 7 is a front view showing a third one of a lamp unit of the vehicle headlamp.
Figure 8:
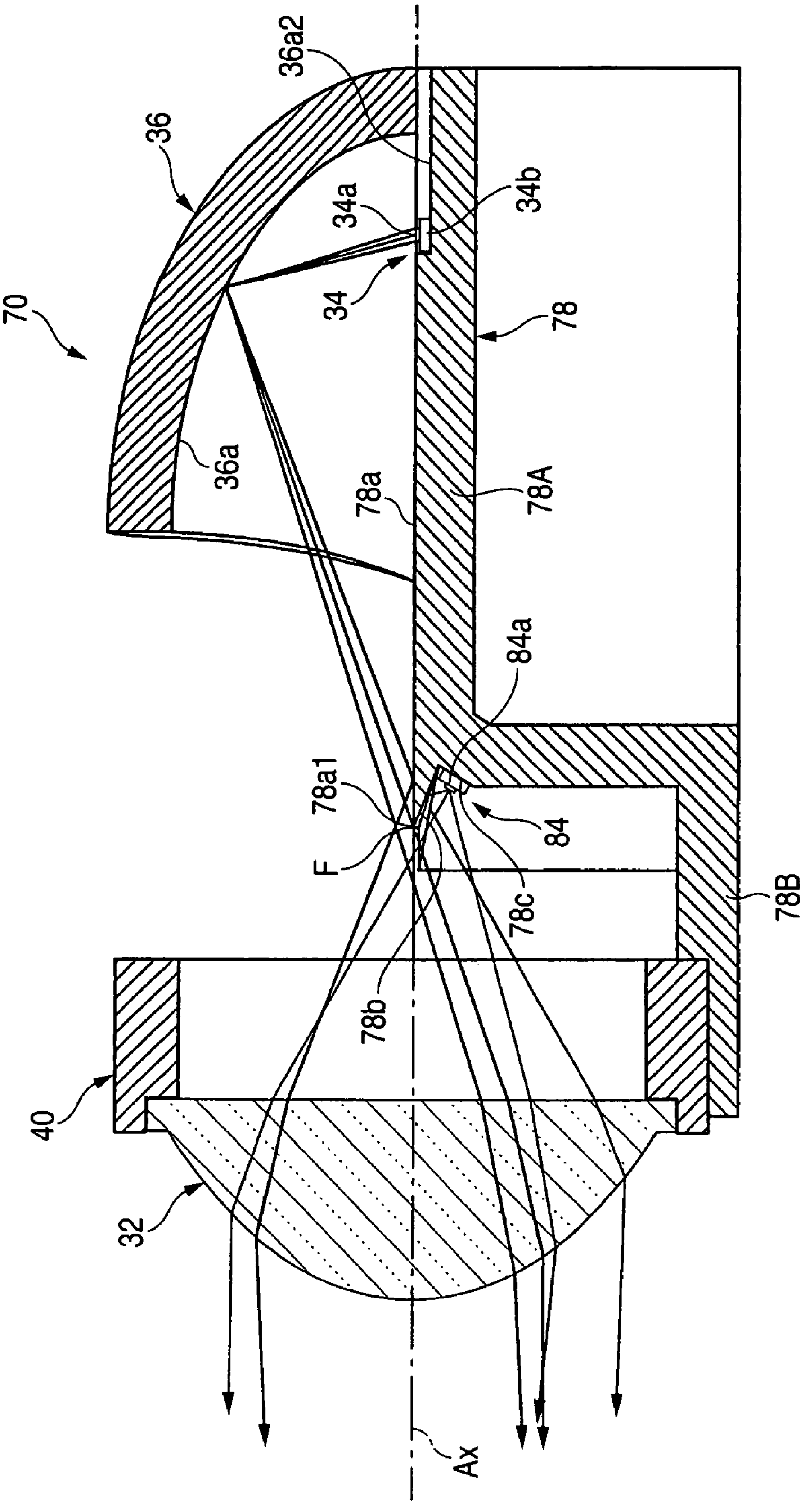
FIG. 8 is a sectional view taken along a line VIII-VIII of FIG. 7.
Figure 9:
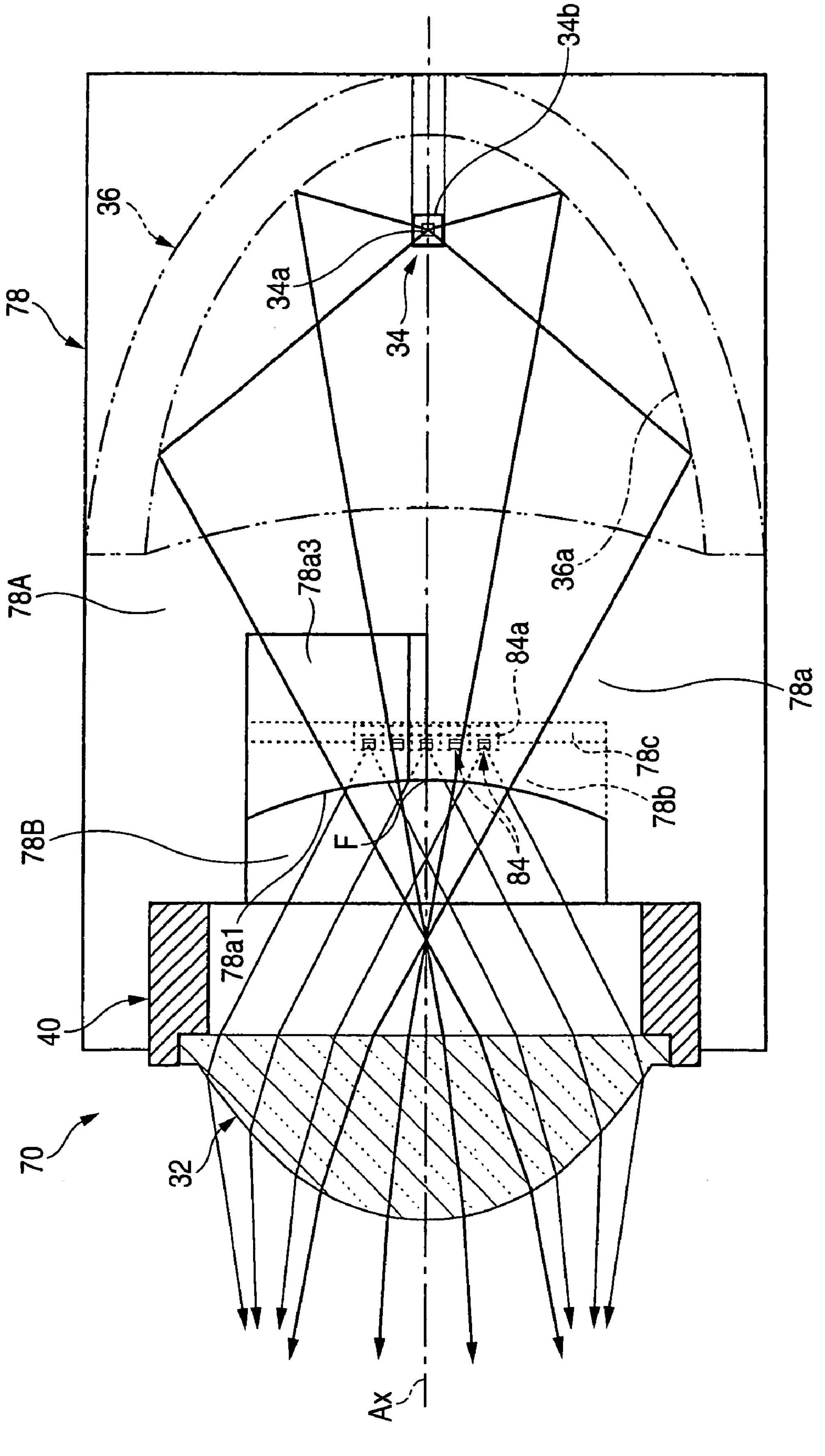
FIG. 9 is a sectional view taken along a line IX-IX of FIG. 7.

FIG. 7 is a front view showing a lamp unit 70, FIG. 8 is a sectional view taken along a line VIII-VIII, and FIG. 9 is a sectional view taken along a line IX-IX of FIG. 7.

As shown by the drawings, although a basic constitution of the lamp unit 70 is similar to that of the lamp unit 30, a constitution of a base member 78 and arrangement of five second light emitting elements 84 thereof differ from those of the case of the lamp unit 30, further, the lamp unit 70 is not arranged with a member in correspondence with the metal made member 42 of the lamp unit 30.

The base member 78 of the lamp unit 70 is formed with a downward directed inclined face 78*b* extended in a skewed lower direction from a front end edge 78*a*1 of an upper face 78*a* of a flat plate portion 78*a* thereof to a lower side. In accordance therewith, according to a semicylindrical portion 78B of the base member 78, a rear face wall thereof is displaced to a rear side more than in the case of the lamp unit 30. At an upper portion of a front face of the rear face wall of the semicylindrical portion 78B, an upward directed inclined face 78*c* rearwardly inclined relative to a vertical direction by about 30° is formed to connect to the downward inclined face 78*b*. Both of the downward directed inclined face 78*b* and the upper directed inclined face 78*c* are formed to extend in a planar shape in a left and right direction. However, a front end edge 78*a*1 of the upper face 78*a* of the flat plate portion 78A is formed to constitute a stepped difference in the left and right direction and therefore, a front end edge of the downward directed inclined face 78*b* is formed to constitute a stepped difference in the left and right direction. A constitution of a stepped down flat face portion 78*a*3 and other portion of the base member 78 is similar to that in the case of the lamp unit 30.

The five second light emitting elements 84 are fixedly supported by the upward directed inclined face 78*c* of the base member 78 for irradiating light to the projecting lens 32. The five second light emitting elements 84 are arranged to be contiguous to each other without gaps therebetween in a horizontal direction. Thereby, the light emitting chips 84*a* of the respective second light emitting elements 84 are arranged to be directed in an upper direction relative to a front side in the optical axis Ax direction by about 30° on a rear side of the rear side focal face of the projecting lens 32 and at a lower vicinity of the downward directed inclined face 78*b* of the base member 78 (that is, a position comparatively proximate to the optical axis Ax on a lower side of the optical axis Ax). Specifically, the respective second light emitting elements 84 are arranged at positions rearward from the rear side focal point F of the projecting lens 32 by about 3 mm at positions downward from the optical axis Ax by about 3 mm. Further, the constitution per se of the respective second light emitting elements 84 is similar to that of the respective second light emitting elements 44 of the lamp unit 30.

The downward directed inclined face 78*b* of the base member 78 is subjected to a mirror face treatment of depositing aluminum or the like. Thereby, light of light emitted from the light emitting chips 84*a* of the respective second light emitting elements 84 incident on the downward directed inclined face 78*b* is reflected as light in a skewed lower direction to the front side and the light is made to be incident on the projecting lens 32.

Figure 11:
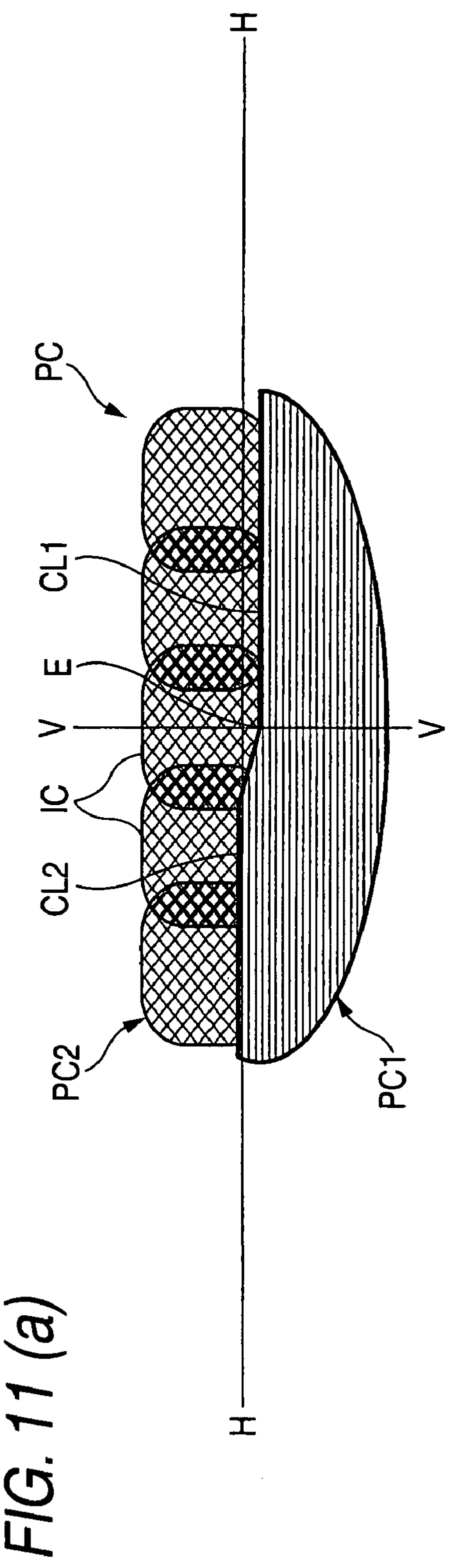
FIG. 11(*a*) is a diagram showing a light distribution pattern formed on the imaginary vertical screen by light emitted from the third one of the lamp unit to the front side, FIG. 11(*b*) is a diagram showing a light distribution pattern formed on the imaginary vertical screen by light emitted from the fourth one of the lamp unit to the front side.
Figure 11:
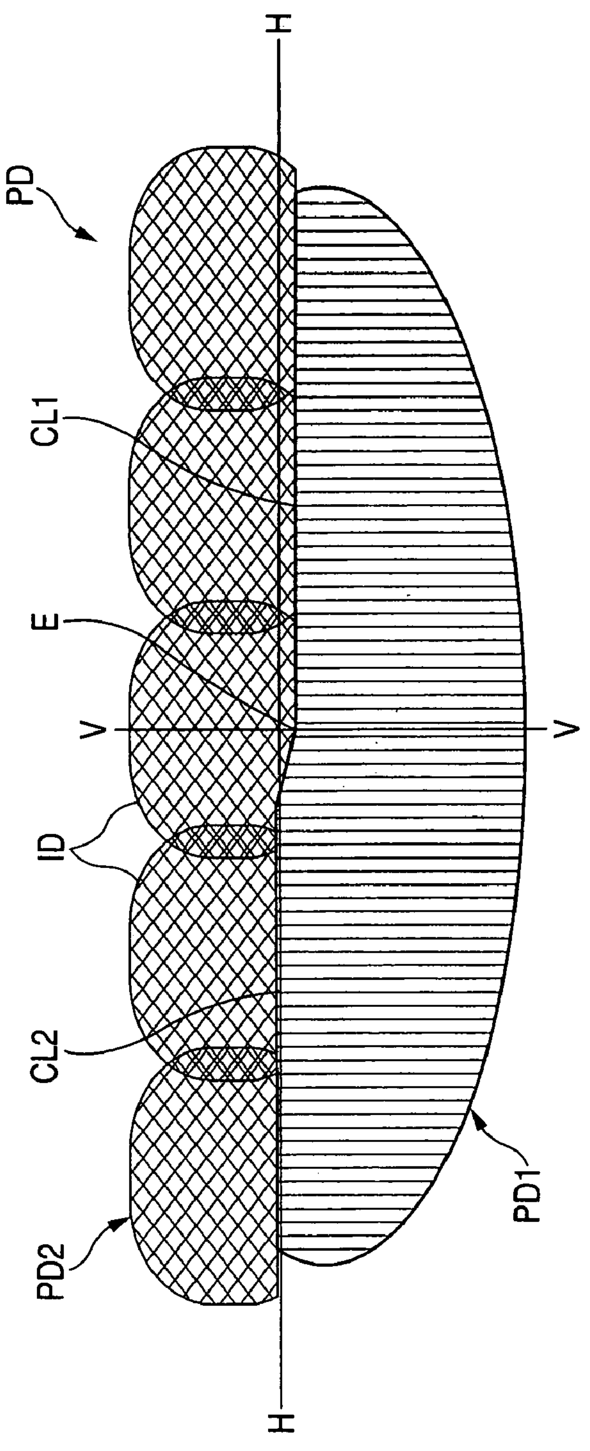

FIG. 11(*a*) is a diagram showing a light distribution pattern PC formed on an imaginary vertical screen arranged at a position 25 m frontward from the lamp by light irradiated from the lamp unit 30 to the front side.

As shown by the drawing, the light distribution pattern PC is formed as a light distribution pattern synthesized with a basic light distribution pattern PC1 and an additional light distribution pattern PC2.

The basic light distribution pattern PC1 is a light distribution pattern formed by light from the light emitting chip 34*a* incident on the projecting lens 32 by being reflected by the reflecting face 36*a* of the reflector 36 and is formed as a transversely-prolonged comparatively small light distribution pattern having substantially a bow-like shape.

The basic light distribution pattern PC1 is formed by a shape and a luminous intensity distribution substantially the same as those of the basic light distribution pattern PA1 shown in FIG. 6(*a*) except a shape of a lower end portion thereof. Although the basic light distribution pattern PC1 is not constituted by a shape of chipping off the lower end portion as in the basic light distribution pattern PA1, this is because the lamp unit 70 is not arranged with the metal made member 42 as in the lamp unit 30 and a portion of light reflected from the reflector 36 is not shielded by the metal made member 42.

On the other hand, the additional light distribution pattern PC2 is a light distribution pattern formed by light incident on the reflecting lens 32 as directly emitted light from the light emitting chips 84*a* of the five second light emitting elements 84 and is formed as an assembly of inverted projected images IC of the light emitting chips 84*a* of the five second light emitting elements 84 inversely projected by the projecting lens 32.

The light emitting chips 84*a* of the respective second light emitting elements 84 are disposed at positions remote from the rear side focal face of the projecting lens 32 to the rear side and therefore, the inverted projected image IC becomes an image having a large outer shape and a low clearness in comparison with a case in which the light emitting chip 84 is disposed on the rear side focal face.

The five second light emitting elements 84 are arranged to be contiguous to each other in a horizontal direction on a lower side of the optical axis Ax and therefore, the inverted projected images IC of the light emitting chips 84*a* of the respective second light emitting elements 84 are formed to be contiguous to each other in the horizontal direction on an upper side of H-H line. Further, the five second light emitting elements 84 are arranged without gaps therebetween, and therefore, the five inverted projected images IC are formed to partially overlap each other. Further, according to the respective inverted projected images IC, a shape of an image formed at the rear side focal point face of the projecting lens 32 by light emitted from the respective second light emitting elements 84 is rectified by the front end edge 78*a*1 of the upper face 78*a* of the flat plate portion 78A of the base member 78, and therefore, the image is formed without overlapping the basic light distribution pattern PC1 and without being remote therefrom at an upper vicinity of the cutoff line CL1, CL2 of the basic light distribution pattern PC1.

Not only light directly incident on the projecting lens 32 after having been emitted from the respective light emitting elements 84, but also, light incident on the projecting lens 32 after having been reflected by the downward directed inclined face 78*b* of the base member 78 are used for forming the respective inverted projected images IC and therefore, a lower end edge vicinity portion thereof becomes a relatively bright image.

Thereby, the additional light distribution pattern PC2 becomes a light distribution pattern formed continuously to the basic light distribution pattern as a single transversely-prolonged light distribution pattern at an upper vicinity of the cutoff lines CL1, CL2 as the basic light distribution pattern PC1 and constitutes a relatively bright light distribution pattern at a portion at a vicinity of a lower end edge thereof.

Next, an explanation will be given of a constitution of another one of the lamp unit 90 exclusive for low beam.

Figure 10:
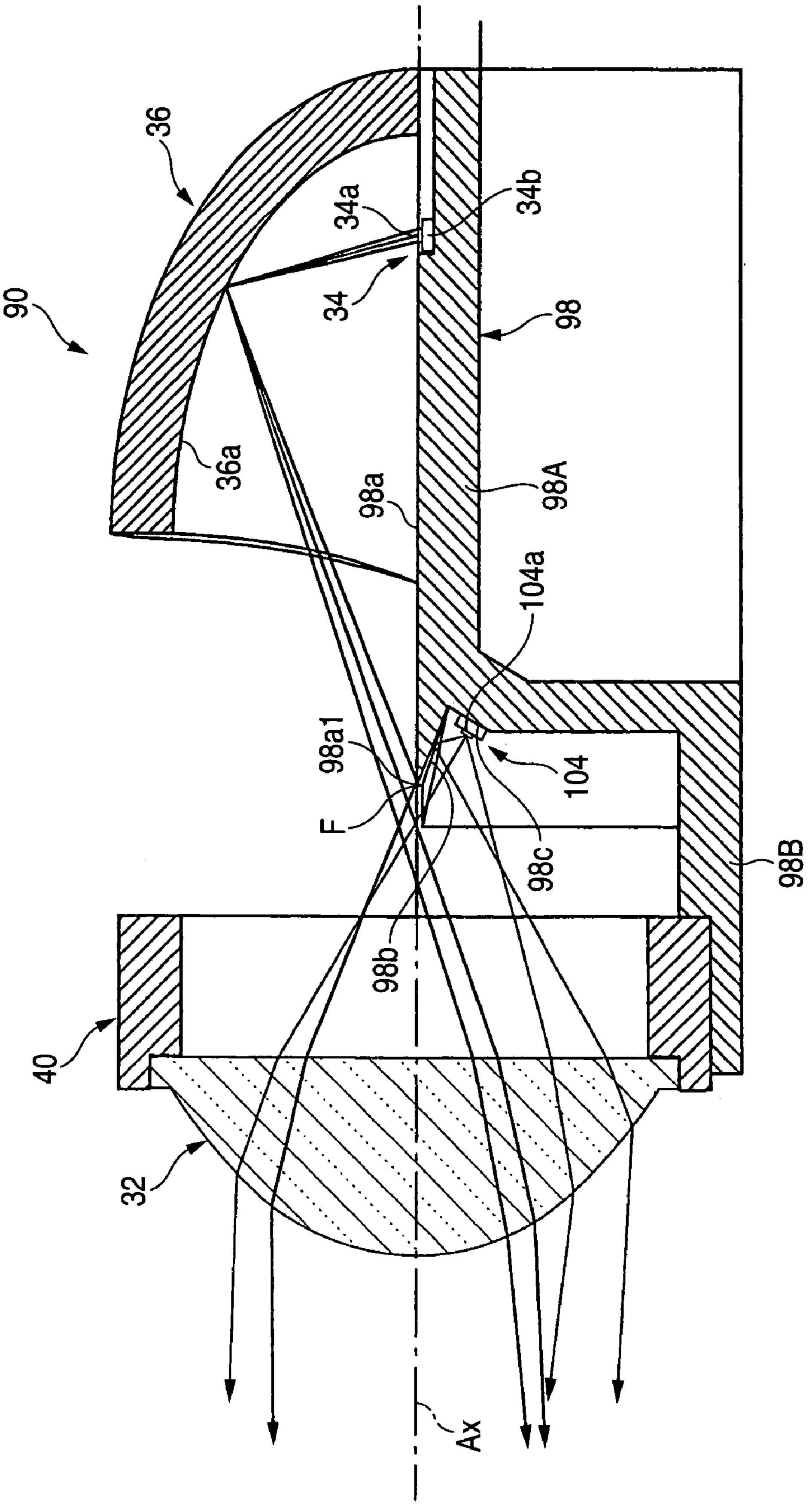
FIG. 10 is a view similar to FIG. 8 showing a fourth one of a lamp unit of the vehicle headlamp.

FIG. 10 is a view similar to FIG. 8 showing the lamp unit 90.

As shown by the drawing, although a basic constitution of the lamp unit 90 is similar to that of the lamp unit 70, a constitution of a base member 98 and arrangement of five second light emitting elements 104 thereof differ from those in the case of the lamp unit 70.

That is, according to the base member 98 of the lamp unit 90, a front and rear length of a flat plate portion 98A thereof is set to a value slightly shorter than the flat plate portion 78A of the base member 78 of the lamp unit 70 (specifically, a value shorter by about 3.5 mm). However, a positional relationship between a front end edge 98*a*1 of an upper face 98*a* of the flat plate portion 98A of the base member 98 and the rear side focal point F of the projecting lens 32 is set to a positional relationship similar to that in the case of the base member 78.

Thereby, according to the lamp unit 90, a position of converging light reflected from the reflector 36 is displaced slightly on a front side of the rear side focal point F of the projecting lens 32, and the image of the light emitting chip 34*a* of the first light emitting element 34 formed at the rear side focal face is made to be larger than that in the case of lamp unit 70.

Also the base member 98 of the lamp unit 90 is formed with a downward directed inclined face 98*b* extended in a skewed lower direction from the upper end edge 98*a*1 of the upper face 98*a* of the flat plate portion 98A to a rear side, and an upper portion of a front face of a rear face wall of a semicylindrical portion 98B thereof is formed with an upward directed inclined face 98*c* rearwardly inclined relative to the vertical direction by about 30□ to connect to the downward directed inclined face 98*b*. However, the upward directed inclined face 98*c* is formed at a position of being remote from the rear side focal point F of the projecting lens 32 more than the downward-directed lamp unit 70.

Although five second light emitting elements 104 of the lamp unit 90 are arranged to be contiguous to each other in the horizontal direction at the upward directed inclined face 98*c* of the base member 98 similar to the case of the lamp unit 70, at the same time, as shown by FIG. 1, the five second light emitting elements 104 are arranged with more or less gaps therebetween. Specifically, the respective second light emitting elements 104 are arranged at positions rearward from the rear side focal point F of the projecting lens 32 by about 4 mm at positions downward from the optical axis Ax by about 4 mm, gaps between the respective second light emitting elements 104 are set to a value of about 1.5 mm. The constitution per se of the respective second light emitting elements 104 is similar to that of the respective second light emitting elements 44 of the lamp unit 30.

FIG. 11(*b*) is a diagram showing a light distribution pattern PD formed on the imaginary vertical screen by light irradiated from the lamp unit 90 to the front side.

As shown by the drawing, the light distribution pattern PD is formed as a light distribution pattern synthesized with a basic light distribution pattern PD1 and an additional light distribution pattern PD2.

The basic light distribution pattern PD1 is a light distribution pattern formed by light from the light emitting chip 34*a* incident on the projecting lens 32 by being reflected by the reflecting face 36*a* of the reflector 36 and a transversely-prolonged comparatively large light distribution pattern having substantially a bow-like shape.

The basic light distribution pattern PD1 is formed by a shape and a luminous intensity distribution pattern the same as those of the basic light distribution pattern PD1 shown in FIG. 6(*b*) except a shape of a lower end portion thereof. Although the basic light distribution pattern PD1 is not constituted by a shape of chipping off the lower end portion as in the basic light distribution pattern PB1, this is because the lamp unit 90 is not arranged with the metal made member 62 as in the lamp unit 50 and a portion of light reflected from the reflector 36 is not shielded by the metal made member 62.

On the other hand, the additional light distribution pattern PD2 is a light distribution pattern formed by light incident on the projecting lens 32 as directly emitted light from light emitting chips 104*a* of the five second light emitting elements 104 and is formed as an assembly of inverted projected images ID of the light emitting chips 104*a* of the five second light emitting elements 104 inversely projected by the projecting lens 32.

The five second light emitting elements 104 are arranged to be contiguous to each other in the horizontal direction on the lower side of the optical axis Ax and therefore, the inverted projected images ID of the light emitting chips 104*a* of the respective second light emitting elements 104 are formed to be contiguous to each other in the horizontal direction on an upper side of H-H line. According to the respective inverted projected images ID, images thereof formed at the rear side focal face of the projecting lens 32 by light emitted from the respective second light emitting elements 104 are rectified by the front end edge 98*a*1 of the upper face 98*a* of the flat plate portion 98A of the base member 98, and therefore, the images are formed without overlapping the basic light distribution pattern PD1 and without being remote therefrom at an upper vicinity of the cutoff line CL1, CL2 of the basic light distribution pattern PD1.

Not only light directly incident on the projecting lens 32 after having been emitted from the respective second light emitting elements 104, but also, light incident on the projecting lens 32 after having been reflected by the downward directed inclined face 98*b* of the base member 98 are used for forming the respective inverted projected images ID and therefore, a lower end edge vicinity portion thereof becomes a relatively bright image.

The light emitting chips 104*a* of the respective second light emitting elements 104 are disposed at positions of being remote from the rear side focal face of the projecting lens 32 more than those in the case of the lamp unit 70, and therefore, the inverted projected images ID become images having an outer shape larger than that of the inverted projected image IC and a clearness and a luminous intensity lower than the inverted projected image IC. Therefore, although the five second light emitting elements 104 are arranged with more or less gaps therebetween, the five inverted projected images ID are formed to overlap each other.

Thereby, the additional light distribution pattern PD2 is formed to be continuous to the basic light distribution pattern PD1 as a single transversely-prolonged light distribution pattern at an upper vicinity of the cutoff line CL1, CL2 of the basic light distribution pattern PD1 and constitutes a relatively bright light distribution pattern at a portion thereof at a vicinity of a lower end edge thereof.

Figure 12:
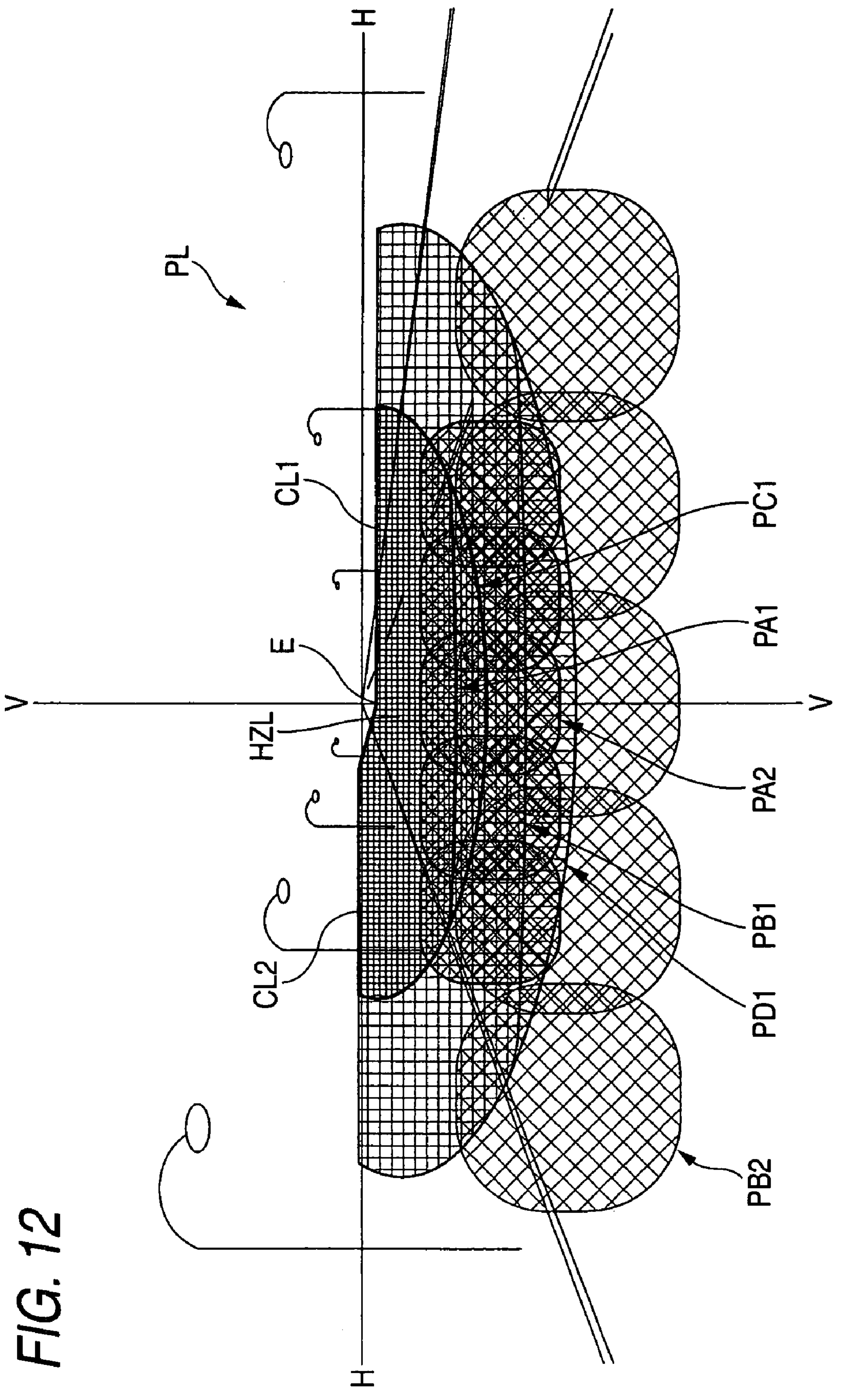
FIG. 12 is a diagram perspectively showing a light distribution pattern for low beam formed on the imaginary vertical screen by light emitted from the vehicle headlamp to the front side.

FIG. 12 is a diagram perspectively showing a light distribution pattern PL for low beam formed on the imaginary vertical screen by light irradiated from the vehicle headlamp 10 according to the embodiment shown to the front side.

The light distribution pattern PL for low beam is formed by switching on the first light emitting elements 34 of the four lamp units 30, 50, 70, 90 and switching on the five second light emitting elements 44, 64 of the two lamp units 30, 50 exclusively for low beam.

That is, the light distribution pattern PL for low beam is formed as a light distribution pattern synthesized with the four basic light distribution patterns PA1, PB1, PC1, PD1 and the two additional light distribution patterns PA2, PB2.

The light distribution pattern PL for low beam is a light distribution pattern for low beam of a left light distribution pattern having the cutoff lines CL1, CL2 at an upper end portion thereof, and a hot zone HZL constituting a high luminous intensity region is formed to surround an elbow point E thereof.

The hot zone HZL is formed mainly by the two basic light distribution patterns PA1, PC1 and a brightness thereof is intensified by the additional light distribution pattern PA2. Further, a shape of a total of the light distribution pattern PL for low beam is formed by the two basic light distribution patterns PB1, PD1 and a brightness thereof is intensified by the additional light distribution pattern PB2.

The light distribution pattern PL for low beam illuminates a vehicle front side road face widely from a short distance region to a long distance region, thereby, optical recognizability in running a vehicle in a low beam mode is sufficiently ensured.

Figure 13:
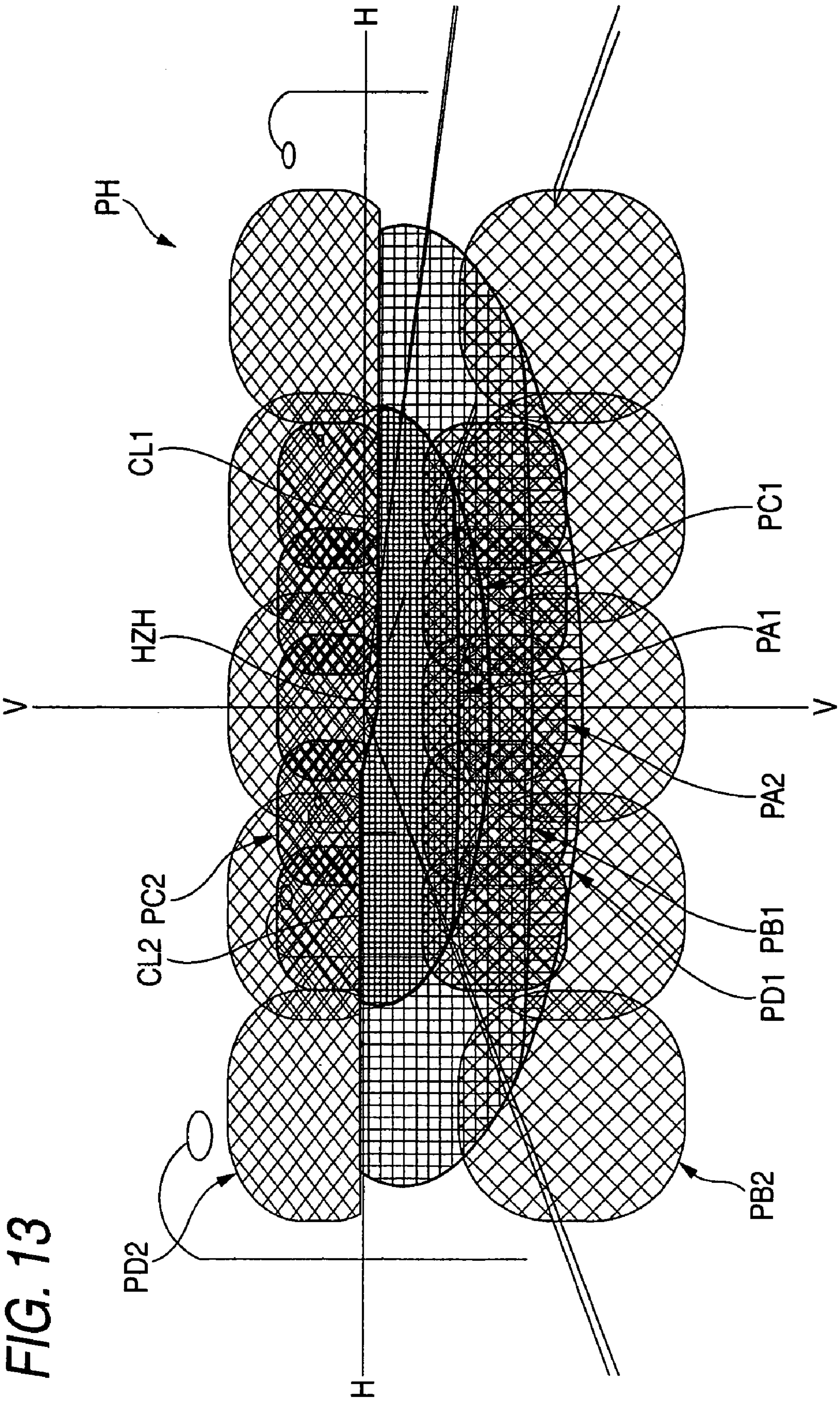
FIG. 13 is a diagram perspectively showing a light distribution pattern for high beam formed on the imaginary vertical screen by light emitted from the vehicle headlamp to the front side.

FIG. 13 is a diagram perspectively showing a light distribution pattern PH for high beam formed on the imaginary vertical screen by light irradiated from the lamp unit 10 according to the embodiment shown to the front side.

The light distribution pattern PH for high beam is formed by switched ON all of the first light emitting elements 34 of the four lamp units 30, 50, 70, 90 and the five second light emitting elements 44, 64, 84, 104.

That is, the light distribution pattern PH for high beam is formed as a light distribution pattern synthesized with the light distribution pattern PL for low beam and the two additional light distribution patterns PC2, PD2.

The light distribution pattern PH for high beam is formed as a light distribution pattern enlarged to upper sides of the cutoff liens CL1, CL2 in comparison with the light distribution pattern PL for low beam and a hot zone HZH thereof is formed at a vicinity of H-V.

The hot zone HZH is formed mainly by the two basic light distribution patterns PA1, PC1 and the additional light distribution pattern PC2. Further, a shape of a total of the light distribution pattern PH for high beam is formed by the two basic light distribution patterns PB1, PD1 and the additional light distribution pattern PD2.

The two additional light distribution patterns PC2, PD2 are constituted by light distribution patterns having a relatively bright lower end edge vicinity portions and therefore, a continuity to the light distribution pattern PL for low beam is made to be high. Thereby, the additional light distribution pattern PC2 is made to be suitable for forming the hot zone HZH, and the additional light distribution pattern PD2 is made to be suitable for forming the shape of the total of the light distribution pattern PH for high beam.

In this way, the light distribution pattern PH for high beam is constituted by a light distribution pattern for brightly illuminating the vehicle front side road face and a space thereabove, thereby, optical recognizability in running the vehicle in a high beam mode is sufficiently ensured.

As has been described in details, in the vehicle lamp 10 according to the embodiment shown, the lamp unit 30 is constituted as the lamp unit of the projector type constituting a light source by the first light emitting element 34, a vicinity of the rear side focal face of the projecting lens 32 is arranged with the five second light emitting elements 44 for irradiating light to the projecting lens 32 and therefore, the basic light distribution pattern PA1 can be formed by switching ON the first light emitting element 34, the additional light distribution pattern PA2 can additionally be formed to the basic light distribution pattern PA1 by additionally switching ON the five second light emitting elements 44, thereby, the light distribution pattern PA formed by light irradiated from the lamp unit 30 can be made to be sufficiently bright.

All of the five second light emitting elements 44 are arranged at a vicinity of the rear side focal face of the projecting lens 32, and therefore, although light emitted from the respective second light emitting elements 44 can be made to be incident on the projecting lens 32 as directly emitted light, the inverted projected images IA of the light emitting chips 44*a* can be made to be sufficiently bright, thereby, the additional light distribution pattern PA2 can be made to be sufficiently bright.

In this respect, the same goes with the other three lamp units 50, 70, 90.

Therefore, according to the embodiment shown, when lamp units of a projector type are adopted as the lamp units 30, 50, 70, 90 of the vehicle headlamp 10 constituting the light sources by the light emitting elements, the lamp can be downsized and simplified.

The five second light emitting elements 44, 64, 84, 104 of the respective lamp units 30, 50, 70, 90 are arranged not on the rear side focal face of the projecting lens 32 but at positions of being remote from the rear side focal face in the front and rear direction, and therefore, the inverted projected images IA, IB, IC, ID of the light emitting chips 44*a*, 64*a*, 84*a*, 104*a* of the respective second light emitting elements 44, 64, 84, 104 can be constituted by images having large outer shapes and low clearnesses in comparison with inverted projected images when the respective light emitting chips 44*a*, 64*a*, 84*a*, 104*a* are assumedly arranged on the rear side focal face, thereby, a nonuniformity in the light distribution by additionally forming additional light distribution patterns PA2, PB2, PC2, PD2 can be restrained from being brought about.

In the respective lamp units 30, 50, 70, 90, the five second lamp emitting elements 44, 64, 84, 104 are arranged to be contiguous to each other in the horizontal direction, and therefore, the inverted projected images IA, IB, IC, ID of the light emitting chips 44*a*, 64*a*, 84*a*, 104*a* can be formed to be contiguous to each other in the horizontal direction, thereby, the additional light distribution patterns PA2, PB2, PC2, PD2 can be formed as transversely-prolonged light distribution patterns suitable for illuminating the vehicle front side road face.

Although according to the two lamp units 30, 70, the five second light emitting elements 44, 84 are arranged at positions of being comparatively proximate to the rear side focal face of the projecting lens 32, and therefore, the inverted projected images IA, IC become comparatively small images, since the five second light emitting elements 44, 84 are arranged without gaps therebetween and therefore, the respective inverted projected images IA, IC can be formed to overlap each other. Thereby, the additional light distribution patterns PA2, PC2 formed by the five inverted projected images IA, IC can be formed as comparatively bright and small single transversely-prolonged light distribution patterns.

On the other hand, according to remaining two of the lamp units 50, 90, the five second light emitting elements 64, 104 are arranged at positions of being comparatively remote from the rear side focal face of the projecting lens 32, and therefore, the inverted projected images IB, ID become comparatively large images, and therefore, although the five second light emitting elements 44, 84 are arranged with more or less gaps therebetween, the respective inverted projected images IB, ID can be formed to overlap each other. Thereby, the additional light distribution patterns PB2, PD2 formed by the five inverted projected images IB, ID can be formed as comparatively dark and large single transversely-prolonged light distribution patterns.

In the respective lamp units 30, 50, 70, 90, the flat plate portions 38A, 58A, 78A, 98A of the base members 38, 58, 78, 98 are arranged as shades for shielding a portion of light reflected from the reflector 36 between the projecting lens 32 and the reflector 36 such that the front end edges 38*a*1, 58*a*1, 78*a*1, 98*a*1 of the upper faces 38*a*, 58*a*, 78*a*, 98*a* pass the rear side focal point F of the projecting lens 32, and therefore, the basic light distribution patterns PA1, PB1, PC1, PD1 formed by light reflected from the reflector 36 can be made to include the cutoff lines CL1, CL2 at upper end portions thereof, and the basic light distribution patterns can be made to be suitable for forming the light distribution pattern PL for low beam.

According to the flat plate portions 38A, 58A, 78A, 98A of the respective base members 38, 58, 78, 98, the upper faces 38*a*, 58*a*, 78*a*, 98*a* are constituted as upward directed mirror faces, and therefore, also with regard to light reflected from the reflector 36 to be shielded by the respective flat plate portions 38A, 58A, 78A, 98A, the light can be made to be incident on the projecting lens 32 by reflecting the light in an upper direction, the light can effectively utilized as front irradiating light.

Although according to the lamp units 30, 50 exclusively for low beam, the five second light emitting elements 44, 64 are arranged on an upper side of the optical axis Ax, and constituted to illuminate the vehicle front side road face by light emitted therefrom, at the same time, the five second light emitting elements 44, 64 are arranged on a front side of the rear side focal face of the projecting lens 32 and therefore, light emitted therefrom can further be made to be incident on the projecting lens 32.

At the same time, whereas the comparatively bright and small transversely-prolonged additional light distribution pattern PA2 formed by light irradiated from the lamp unit 30 is formed at a lower vicinity of the elbow point E in the light distribution pattern PL for low beam, the comparatively dark and large transversely-prolonged additional light distribution pattern PC2 formed by light irradiated from the lamp unit 50 is formed to surround the additional light distribution pattern PA2 from a lower side, and therefore, the vehicle front side road face can be illuminated substantially by uniform brightness by the additional light distribution patterns PA2, PC2.

On the other hand, according to the lamp units 70, 90 for both of low beam and high beam, the base members 78, 98 are formed with the downward inclined faces 78*b*, 98*b* extended in the skewed lower direction from the front end edges 78*a*1, 98*a*1 of the upper faces 78*a*, 98*a* of the flat plate portions 78A, 98A to the rear side, the five second light emitting elements 84, 104 are arranged on the rear side of the rear side focal face of the projecting lens 32 and at lower vicinities of the downward directed inclined faces 78*b*, 98*b*, and therefore, the additional light distribution patterns PC2, PD2 can be formed continuously to the light distribution pattern PL for low beam on upper sides of the cutoff lines CL1, CL2 of the light distribution pattern for low beam. Therefore, by additionally switching ON the five second light emitting elements 84, 104, the light distribution pattern PH for high beam can be formed.

The downward directed inclined faces 78*b*, 98*b* of the respective base members 78, 98 are constituted as mirror faces, and therefore, by making light reflected by the respective downward directed inclined faces 78*b*, 98*b* incident on the projecting lens 32, the light can effectively be utilized as front irradiating light. At this occasion, according to the two additional light distribution patterns PC2, PD2, lower end edge vicinity portions thereof are formed as relatively bright light distribution patterns, and therefore, a continuity between the additional light distribution patterns PC2, PD2 and the light distribution pattern PL for low beam can be promoted, thereby, the light distribution pattern PH for high beam can be made to be a light distribution pattern having optical recognizability.

According to the lamp units 30, 50, the five second light emitting elements 44, 64 are supported by the metal made members 42, 62, according to the lamp units 70, 90, the five second light emitting elements 84, 104 are supported by the base members 78, 98, and therefore, constitutions of the lamp units 30, 50, 70, 90 can further be simplified and accuracies of positioning the respective second light emitting elements 44, 64, 84, 104 can be promoted, heat generated by switching ON the respective second light emitting elements 44, 64, 84, 104 can be radiated by conducting the heat swiftly to the metal made members 42, 62 or the base members 78, 98 having large heat capacities.

Meanwhile, according to the respective lamp units, 30, 50, 70, 90 of the embodiment shown, with regard to the first light emitting element 34 for forming the basic light distribution pattern by the single light source, it is preferable to use a white light emitting diode having a light emitting amount larger than those of the other five second light emitting elements 44, 64, 84, 104 for promoting clearness of the cutoff lines CL1, CL2.

Further, although according to the embodiment shown, there is constructed a constitution of arranging the five second light emitting elements 44, 64, 84, 104 of the respective lamp units 30, 50, 70, 90 to be contiguous to each other in the horizontal direction, other arrangement can also be adopted, a number of pieces of the respective second light emitting elements 44, 64, 84, 104 can be set to a number of pieces other than 5 pieces.

Although according to the embodiment shown, an explanation has been given such that the respective metal made members 42, 62 are constituted as vertical panels extended along the rear side focal plane of the projecting lens 32, the respective metal made members 42, 62 can also be constituted as vertical panels each having a horizontal sectional shape bent along the rear side focal face of the projecting lens 32. When constituted in this way, the five second light emitting elements 44, 64 are arranged at positions at equal distances from the rear side focal face of the projecting lens 32, thereby, all of sizes of the five inverted projected images IA, IB can uniformly be made to be the same size. Similarly, also the upward directed inclined faces 78*c*, 98*c* of the respective base members 78, 98 can be constituted to be formed to be bent in the left and right direction along the rear side focal face of the projecting lens 32. When constituted in this way, all of the five second light emitting elements 84, 104 are arranged at positions at equal distances from the rear side focal face of the projecting lens 32, thereby, all of the sizes of the five inverted projected images IC, ID can be made to be the same size uniformly.

Although according to the embodiment shown, the base members 38, 58, 78, 98 having a function as mirror members achieve a function as shades for shielding a portion of light reflected from the reflector 36, in place of the base members 38, 58, 78, 98, there can be constructed a constitution including a normal shade having only a function of shielding a portion of light reflected from the reflector 36.

Although according to the embodiment shown, as the vehicle headlamp 10, there is constructed a constitution of including the four lamp units 30, 50, 70, 90, there can be constructed a constitution including lamp units of a number of pieces other than four.

Next, modified examples of the embodiment described above will be explained.

First, a first modified example of an embodiment will be explained.

Figure 14:
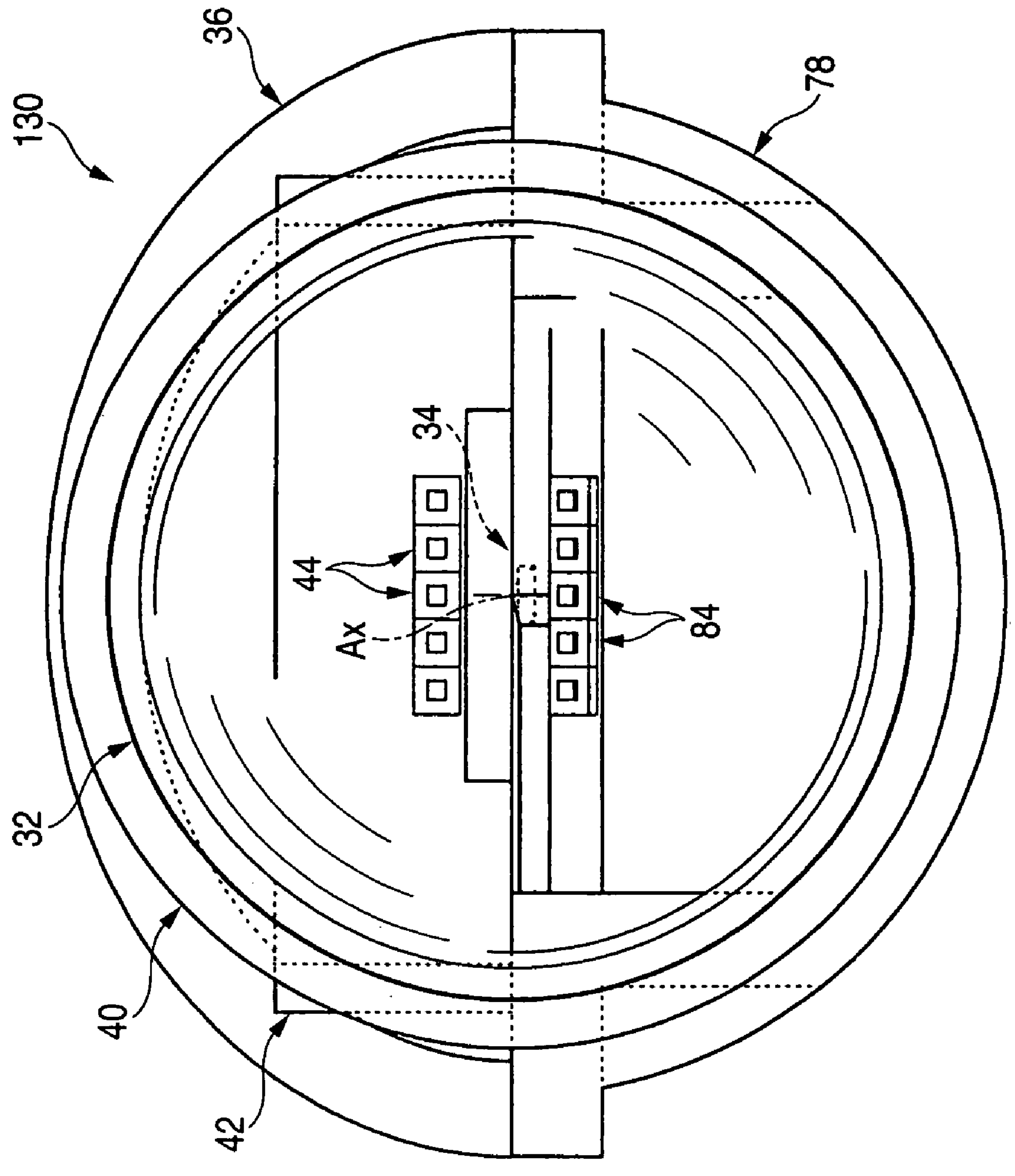
FIG. 14 is a view similar to FIG. 2 showing a lamp unit according to a first modified example of the embodiment.

FIG. 14 is a view similar to FIG. 2 showing a lamp unit 130 according to the modified example.

As shown by the drawing, the lamp unit 130 is constructed by a constitution of combining the metal made member 42 and the five second light emitting elements 44 of the lamp unit 30 exclusively for low beam to the constitution of the lamp unit 70 for both of low beam and high beam.

By adopting the constitution of the modified example, a light distribution pattern combined with the light distribution pattern PA shown in FIG. 6(*a*) and the additional light distribution pattern PC2 of the light distribution pattern PC shown in FIG. 11(*a*) can be formed.

Next, a second modified example of an embodiment will be explained.

Figure 15:
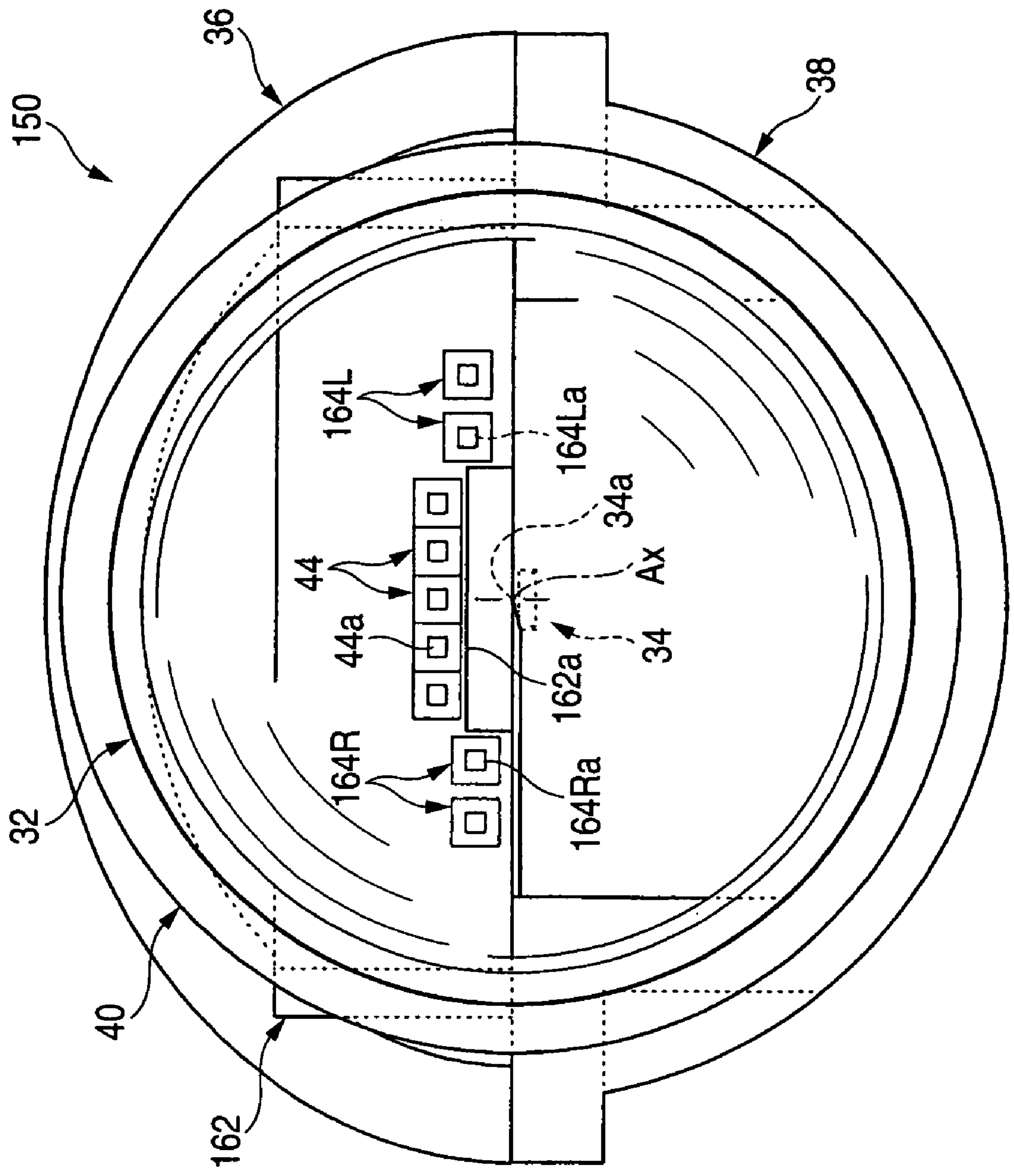
FIG. 15 is a view similar to FIG. 2 showing a lamp unit according to a second modified example of the embodiment.

FIG. 15 is a diagram similar to FIG. 2 showing a lamp unit 150 according to the modified example.

As shown by the drawing, although a basic constitution of the lamp unit 150 is similar to that of the lamp unit 30, a constitution of a metal made member 162 thereof partially differs from that in the case of the lamp unit 30, and the constitution differs from that of the case of the lamp unit 30 in that four second light emitting elements 164L, 164R are arranged other than the five second light emitting elements 44.

That is, although basic shape and arrangement of the metal made member 162 is similar to those of the metal made member 42 of the lamp unit 30, a width in a left and right direction of a notched portion 162*a* thereof is set to a value slightly smaller than that of the notched portion 42*a* of the metal made member 42.

The four second light emitting elements 164L, 164R are arranged at portions of vicinities of two left and right sides of the notched portion 42*a* at a front face of the metal made member 162 in twos.

The two second light emitting elements 164L disposed on the left side of the notched portion 162*a* are arranged to be contiguous to each other by interposing a small gap therebetween in a horizontal direction on a slightly lower side of the five second light emitting elements 44, the second light emitting element 163L disposed on an inner side thereof is arranged at a small gap from the five second light emitting elements 44 in the horizontal direction. On the other hand, the two second light emitting elements 164R disposed on the right side of the notched portion 162*a* are arranged to be contiguous to each other by interposing a small gap therebetween in the horizontal direction slightly on a lower side further from the two second light emitting elements 164L disposed on the left side, the second light emitting element 164R disposed on an inner side thereof is arranged at a small gap from the five second light emitting elements 44 in the horizontal direction. The constitution per se of the respective second light emitting elements 164L, 164R are similar to that of the respective second light emitting elements 44.

Figure 16:
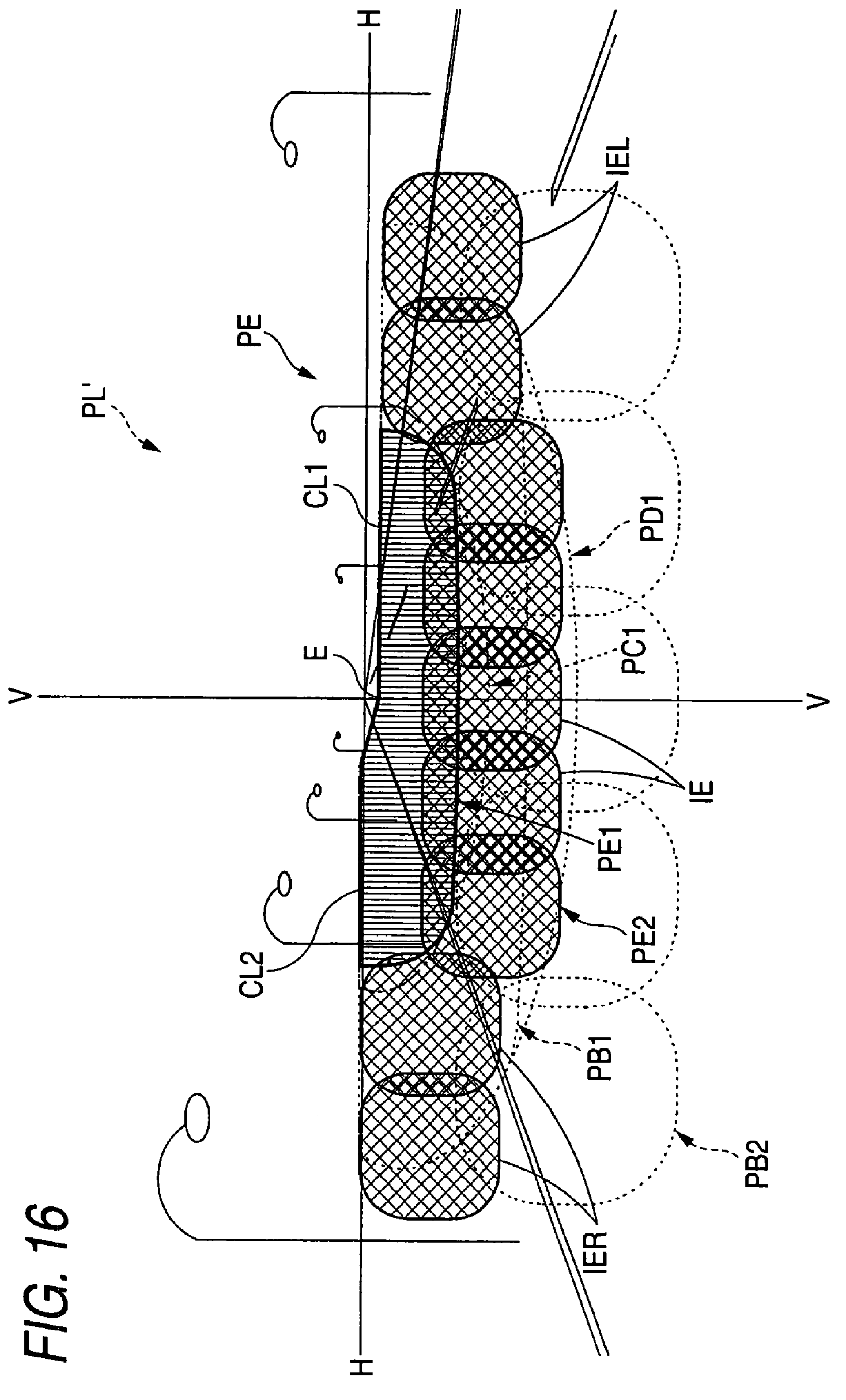
FIG. 16 is a diagram perspectively showing a light distribution pattern formed on the imaginary vertical screen by light irradiated from the lamp unit according to the second modified example to the front side.

FIG. 16 is a diagram perspectively showing a light distribution pattern PE formed on the imaginary vertical screen by light irradiated from the lamp unit 150 to a front side.

As shown by the drawing, the light distribution pattern PE is formed as a light distribution pattern synthesized with a basic light distribution pattern PE1 and an additional light distribution pattern PE2.

The basic light distribution pattern PE1 is a light distribution pattern formed by light from the light emitting chip 34*a* incident on the projecting lens 32 after having been reflected by the reflecting face 36*a* of the reflector 36 and is formed as a transversely-prolonged comparative small light distribution pattern having a substantially bow-like shape.

The basic light distribution pattern PE1 is formed by a shape and a luminous intensity distribution substantially the same as those of the basic light distribution pattern PA1 shown in FIG. 6(*a*) except shapes of the two left and right end portions. Although according to the basic light distribution pattern PA1, the two left and right end portions are displaced to be slightly proximate to V-V line more than a curved line indicated by a two-dotted chain line in the drawing, this is because a portion of light reflected from the reflector 36 is shielded by the metal made member 162 without passing the notched portion 162*a* of the metal made member 162.

On the other hand, the additional light distribution pattern PE2 is a light distribution pattern formed by light incident on the projecting lens 32 as the directly emitted light from the light emitting chips 44*a* of the five second light emitting elements 44 and light emitting chips 164La, 164Ra of the four second light emitting elements 163L, 164R, and formed as an assembly of inverted projected images IE of the light emitting chips 44*a* of the five second light emitting elements 44 and inverted projected images IEL, IER of the light emitting chips 164La, 164Ra of the four second light emitting elements 164L, 164R inversely projected by the projecting lens 32.

The five inverted projected images IE are quite similar to the five inverted projected images IA formed by light emitted from the lamp unit 30.

The two inverted projected images IEL are formed to be contiguous to the right side of the five inverted projected images IE, the two inverted projected image IER are formed to be contiguous to the left side of the five inverted projected images IE.

At the same time, since the two second light emitting elements 164L disposed on the left side of the notched portion 42*a* are arranged to be contiguous to each other by interposing the small gap therebetween in the horizontal direction on the slightly lower side further from the five second light emitting elements 44, the two inverted projected images IEL are formed contiguously to each other in the horizontal direction on the slightly upper side of the five inverted projected images IE. An amount of displacing the two second light emitting elements 164L to a lower side is set to a value at which upper end edges of the two inverted projected images IEL are disposed at a height substantially the same as that of the cutoff line CL1 on a side of an opposed vehicle lane. The two second light emitting elements 164L are arranged by interposing a small gap from the five second light emitting elements 44, and therefore, the two inverted projected images IEL are formed to slightly overlap the five inverted projected images IE, a small gap is provided between the two second light emitting elements 164, and therefore, also the two inverted projected images IEL are formed to slightly overlap each other.

On the other hand, the two second light emitting elements 164R disposed on the right side of the notched portion 42*a* are arranged to be contiguous to each other with a small gap therebetween in the horizontal direction on the further lower side of the two second light emitting elements 164L and therefore, the two inverted projected images IER are formed to be contiguous to each other in the horizontal direction on a slightly upper side of the two inverted projected images IEL. An amount of displacing the two second light emitting elements 164R is set to a value such that upper end edges of the two inverted projected images IER are disposed at a height substantially the same as that of the driving vehicle lane side cutoff line CL2. The two second light emitting elements 164R are arranged at a small gap from the five second light emitting elements, and therefore, the two inverted projected images IER are formed to slightly overlap the five inverted projected images IE, a small gap is provided between the two second light emitting elements 164R and therefore, also the two inverted projected images IER are formed to slightly overlap each other.

Thereby, the additional light distribution pattern PE2 is formed as the single transversely-prolonged light distribution pattern at a lower vicinity of the cutoff lines CL1, CL2 of the basic light distribution pattern PE1, at the same time, formed to intensify a brightness on two left and right sides of the basic light distribution pattern PE1.

By adopting the constitution of the modified example in this way, the brightness of the two left and right sides of the basic light distribution pattern PE1 can be intensified, and therefore, for example, when the lamp unit 150 according to the modified example is integrated to the vehicle headlamp 10 in place of the lamp unit 30, as shown by a broken line in FIG. 16, the light distribution pattern PL' for low beam can be made to be excellent in optical recognizability of regions on two left and right sides of the vehicle frontward road face.

According to the drawing, in a low beam mode, the basic light distribution patterns PB1, PC1, PD1 and the additional light distribution pattern PB2 formed by light irradiated from the other lamp units 50, 70, 90 are indicated by broken lines.

By integrating the lamp unit 150 according to the modified example to the vehicle headlamp 10 in place of the lamp unit 30 in this way, also a light distribution pattern for high beam can be made to be excellent in optical recognizability of the region on the two left and right sides of the vehicle front side road face.

Numerical values shown as data in the embodiments described above are only examples and the numerical values may naturally be set to pertinent different values.

DESCRIPTION OF REFERENCE NUMERALS AND SIGNS

10 vehicle headlamp
12 lamp body
14 transparent cover
16 metal made bracket
20 aiming mechanism
30, 50, 70, 90, 130, 150 lamp units
32 projecting lens
34 first light emitting element
34*a*, 44*a*, 64*a*, 84*a*, 104*a*, 164La, 164Ra light emitting chips
34*b*, 44*b* boards
36 reflector
36*a* reflecting face
38, 58, 78, 98 base members
38A, 58A, 78A, 98A flat plate portions
38B, 58B, 78B, 98B semicylindrical portions
38*a*, 58*a*, 78*a*, 98*a* upper faces
38*a*1, 58*a*1, 78*a*1, 98*a*1 front end edges
38*a*2 recessed groove portion
38*a*3, 78*a*3 stepped down flat face portions
40 lens holder
42, 62, 162 metal made members
42*a*, 62*a*, 162*a* notched portions
44, 64, 84, 104, 164L, 164R second light emitting elements
78*b*, 98*b* downward directed inclined faces
78*c*, 98*c* upward directed inclined face Ax optical axis CL1 opposed vehicle lane side cutoff line CL2 driving vehicle lane side cutoff line E elbow point F rear side focal point HZH, HZL hot zones IA, IB, IC, ID, IE, IEL, IER inverted projected images PA, PB, PC, PD, PE light distribution patterns PA1, PB1, PC1, PD1, PE1 basic light distribution patterns PA2, PB2, PC2, PD2, PE2 additional light distribution patterns PH light distribution pattern for high beam PL, PL' light distribution patterns for low beam While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A lamp unit of a vehicle headlamp comprising:

a projecting lens arranged on an optical axis extended in a front and rear direction of a vehicle, a first light emitting element arranged on a rear side of a rear side focal point of the projecting lens, and a reflector for reflecting light from the first light emitting element to a front side proximate to an optical axis;

wherein a vicinity of a rear side focal face of the projecting lens is arranged with a plurality of second light emitting elements for emitting light to the projecting lens.

2. The lamp unit of a vehicle headlamp according to claim 1, wherein the plurality of second light emitting elements are arranged at positions remote from the rear side focal face of the projecting lens.

3. The lamp unit of a vehicle headlamp according to claim 1, wherein the plurality of second light emitting elements are arranged to be contiguous to each other in a horizontal direction.

4. The lamp unit of a vehicle headlamp according to claim 1, wherein a shade for shielding a portion of light reflected from the reflector is arranged between the projecting lens and the reflector such that an upper end edge of the shade passes the rear side focal point of the projecting lens.

5. The lamp unit of a vehicle headlamp according to claim 4, wherein the shade is constituted as a mirror member including an upward directed mirror face extended from the upper end edge of the shade in a rear direction.

6. The lamp unit of a vehicle headlamp according to claim 4, wherein the plurality of second light emitting elements are arranged on an upper side of the optical axis and on a front side of the rear side focal face of the projecting lens.

7. The lamp unit of a vehicle headlamp according to claim 5, wherein the mirror member includes a downward directed inclined face extended from a front end edge of the upward directed mirror face of the mirror member in the rear direction to a skewed lower side;

wherein the plurality of second light emitting elements are arranged on a rear side of the rear side focal face of the projecting lens and at a lower vicinity of the downward directed inclined face.

8. The lamp unit of a vehicle headlamp according to claim 7, wherein the downward directed inclined face of the mirror member is constituted as a mirror face.

9. The lamp unit of a vehicle headlamp according to claim 1, wherein the plurality of second light emitting elements are supported by a common metal made member.

* * * * *